(12) United States Patent
Liu et al.

(10) Patent No.: US 12,177,843 B2
(45) Date of Patent: Dec. 24, 2024

(54) RESOURCE BLOCK GRID ALIGNMENT AT SIDELINK NODES

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 17/704,910

(22) Filed: Mar. 25, 2022

(65) Prior Publication Data

US 2023/0309099 A1 Sep. 28, 2023

(51) Int. Cl.
*H04W 72/20* (2023.01)
(52) U.S. Cl.
CPC .................................. *H04W 72/20* (2023.01)
(58) Field of Classification Search
None
See application file for complete search history.

(56) References Cited

U.S. PATENT DOCUMENTS

2018/0375710 A1* 12/2018 Chae ...................... H04L 5/0048
2020/0154372 A1* 5/2020 Chae ................... H04W 52/383
2021/0289486 A1* 9/2021 Chiu .................... H04L 27/2675
2022/0086860 A1* 3/2022 Panteleev ............... H04W 4/40
2022/0191875 A1* 6/2022 Panteleev ............. H04L 5/0053
2022/0279496 A1* 9/2022 Hahn ...................... H04W 4/40

FOREIGN PATENT DOCUMENTS

WO WO-2021237654 A1 12/2021
WO WO-2021248300 A1 12/2021

OTHER PUBLICATIONS

International Search Report and Written Opinion—PCT/US2023/015894—ISA/EPO—Jul. 28, 2023.

* cited by examiner

*Primary Examiner* — Lonnie V Sweet
(74) *Attorney, Agent, or Firm* — Holland & Hart LLP

(57) ABSTRACT

Methods, systems, and devices for wireless communications are described to support resource block (RB) grid alignment at user equipments (UE) in sidelink communications. In a first example, communicating UEs may support different RB grids and a receiving UE may attempt multiple decoding hypotheses for receiving a sidelink control channel from a transmitting UE, where each hypothesis may correspond to a different RB grid. In a second example, an RB grid for a sidelink control channel may be common, or aligned, for a transmitting UE and a receiving UE, such that the receiving UE may receive the sidelink control channel using the common RB grid. In a third example, demodulation reference signals (DMRSs) and resource element (RE) rate matching for a sidelink control channel may be common, or aligned, for a transmitting UE and a receiving UE, such that the receiving UE may receive the control channel using the aligned DMRSs.

29 Claims, 20 Drawing Sheets

RESOURCE BLOCK GRID ALIGNMENT AT SIDELINK NODES

FIELD OF TECHNOLOGY

The present disclosure relates to wireless communications, including resource block grid alignment at sidelink nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support resource block (RB) grid selection in sidelink signaling such that different user equipment (UE) may select and use different RB grids for communicating with other UEs. However, selecting different RB grids may result in RB grid misalignment between a transmitting UE and a receiving UE, such that the receiving UE may fail to receive part of all of a communication from the transmitting UE.

SUMMARY

The described techniques relate to improved methods, systems, devices, and apparatuses that support resource block (RB) grid alignment at sidelink nodes. Generally, the described techniques may provide for supporting RB grid alignment at user equipments (UEs) that may support selection of different RB grids for sidelink communications. In a first example, communicating UEs may support different RB grids (e.g., within an RB set) and a receiving UE may attempt multiple decoding hypotheses for receiving a sidelink control channel from a transmitting UE, where each hypothesis may correspond to a different RB grid. In a second example, an RB grid for a sidelink control channel (e.g., a control RB grid) may be common, or aligned, for a transmitting UE and a receiving UE (e.g., within an RB set), such that the receiving UE may receive the sidelink control channel using the common RB grid. In a third example, demodulation reference signals (DMRSs) and resource element (RE) rate matching for a sidelink control channel may be common, or aligned (e.g., within an RB set), for a transmitting UE and a receiving UE, such that the receiving UE may receive the control channel using the aligned DMRSs (e.g., DMRSs sharing common locations).

A method for wireless communication at a wireless device is described. The method may include identifying a RB set and a control RB grid, the control RB grid indicating a set of multiple common locations of a control channel within the RB set, transmitting sidelink control information (SCI) via at least a subset of the set of multiple common locations of the control channel within the control RB grid, the SCI indicating a data block grid offset for a sidelink shared data channel with respect to the control RB grid, and transmitting sidelink data via the sidelink shared data channel based on the data block grid offset.

An apparatus for wireless communication at a wireless device is described. The apparatus may include a processor, memory coupled with the processor, and instructions stored in the memory. The instructions may be executable by the processor to cause the apparatus to identify a RB set and a control RB grid, the control RB grid indicating a set of multiple common locations of a control channel within the RB set, transmit SCI via at least a subset of the set of multiple common locations of the control channel within the control RB grid, the SCI indicating a data block grid offset for a sidelink shared data channel with respect to the control RB grid, and transmit sidelink data via the sidelink shared data channel based on the data block grid offset.

Another apparatus for wireless communication at a wireless device is described. The apparatus may include means for identifying a RB set and a control RB grid, the control RB grid indicating a set of multiple common locations of a control channel within the RB set, means for transmitting SCI via at least a subset of the set of multiple common locations of the control channel within the control RB grid, the SCI indicating a data block grid offset for a sidelink shared data channel with respect to the control RB grid, and means for transmitting sidelink data via the sidelink shared data channel based on the data block grid offset.

A non-transitory computer-readable medium storing code for wireless communication at a wireless device is described. The code may include instructions executable by a processor to identify a RB set and a control RB grid, the control RB grid indicating a set of multiple common locations of a control channel within the RB set, transmit SCI via at least a subset of the set of multiple common locations of the control channel within the control RB grid, the SCI indicating a data block grid offset for a sidelink shared data channel with respect to the control RB grid, and transmit sidelink data via the sidelink shared data channel based on the data block grid offset.

In some examples of the method, apparatuses, and non-transitory computer-readable medium described herein, identifying the RB set and the control RB grid may include operations, features, means, or instructions for receiving control signaling indicating the RB set and the control RB grid, the control signaling indicating a configuration for the RB set.

In some examples of the method, apparatuses, and non-transitory computer-readable medium described herein, transmitting the sidelink data via the sidelink shared data channel may include operations, features, means, or instructions for time division multiplexing (TDMing) the sidelink shared data channel with the control channel, where a symbol associated with the sidelink shared data channel follows one or more symbols associated with the control channel, and where the data block grid offset applies to the sidelink shared data channel based on the symbol following the one or more symbols associated with the control channel.

Some examples of the method, apparatuses, and non-transitory computer-readable medium described herein may further include operations, features, means, or instructions for selecting the data block grid offset for the sidelink shared data channel, where transmitting the sidelink data via the sidelink shared data channel may be based on selecting the data block grid offset.

In some examples of the method, apparatuses, and non-transitory computer-readable medium described herein, transmitting the sidelink data via the sidelink shared data channel may include operations, features, means, or instructions for rate matching the sidelink shared data channel in one or more sidelink shared data channel symbols other than one or more RBs of a subchannel associated with the sidelink shared data channel.

In some examples of the method, apparatuses, and non-transitory computer-readable medium described herein, transmitting the sidelink data via the sidelink shared data channel may include operations, features, means, or instructions for rate matching the sidelink shared data channel in one or more sidelink shared data channel symbols other than one or more REs of a subchannel associated with the sidelink shared data channel, where the one or more REs correspond to the data block grid offset.

In some examples of the method, apparatuses, and non-transitory computer-readable medium described herein, transmitting the sidelink data via the sidelink shared data channel may include operations, features, means, or instructions for rate matching the sidelink shared data channel in one or more sidelink shared data channel symbols other than one or more frequency resources associated with the set of multiple common locations of the control channel within the control RB grid.

In some examples of the method, apparatuses, and non-transitory computer-readable medium described herein, the data block grid offset indicates a data block grid within the RB set.

A method for wireless communication at a wireless device is described. The method may include identifying a RB set and a control RB grid, the control RB grid indicating a set of multiple common locations of a control channel within the RB set, receiving SCI via at least a subset of the set of multiple common locations of the control channel within the control RB grid, the SCI indicating a data block grid offset for a sidelink shared data channel with respect to the control RB grid, and receiving sidelink data via the sidelink shared data channel based on the data block grid offset.

An apparatus for wireless communication at a wireless device is described. The apparatus may include a processor, memory coupled with the processor, and instructions stored in the memory. The instructions may be executable by the processor to cause the apparatus to identify a RB set and a control RB grid, the control RB grid indicating a set of multiple common locations of a control channel within the RB set, receive SCI via at least a subset of the set of multiple common locations of the control channel within the control RB grid, the SCI indicating a data block grid offset for a sidelink shared data channel with respect to the control RB grid, and receive sidelink data via the sidelink shared data channel based on the data block grid offset.

Another apparatus for wireless communication at a wireless device is described. The apparatus may include means for identifying a RB set and a control RB grid, the control RB grid indicating a set of multiple common locations of a control channel within the RB set, means for receiving SCI via at least a subset of the set of multiple common locations of the control channel within the control RB grid, the SCI indicating a data block grid offset for a sidelink shared data channel with respect to the control RB grid, and means for receiving sidelink data via the sidelink shared data channel based on the data block grid offset.

A non-transitory computer-readable medium storing code for wireless communication at a wireless device is described. The code may include instructions executable by a processor to identify a RB set and a control RB grid, the control RB grid indicating a set of multiple common locations of a control channel within the RB set, receive SCI via at least a subset of the set of multiple common locations of the control channel within the control RB grid, the SCI indicating a data block grid offset for a sidelink shared data channel with respect to the control RB grid, and receive sidelink data via the sidelink shared data channel based on the data block grid offset.

In some examples of the method, apparatuses, and non-transitory computer-readable medium described herein, identifying the RB set and the control RB grid may include operations, features, means, or instructions for receiving control signaling indicating the RB set and the control RB grid, the control signaling indicating a configuration for the RB set.

In some examples of the method, apparatuses, and non-transitory computer-readable medium described herein, receiving the sidelink data via the sidelink shared data channel may include operations, features, means, or instructions for TDMing the sidelink shared data channel with the control channel, where a symbol associated with the sidelink shared data channel follows one or more symbols associated with the control channel, and where the data block grid offset applies to the sidelink shared data channel based on the symbol following the one or more symbols associated with the control channel.

In some examples of the method, apparatuses, and non-transitory computer-readable medium described herein, receiving the sidelink data via the sidelink shared data channel may include operations, features, means, or instructions for rate matching the sidelink shared data channel in one or more sidelink shared data channel symbols other than one or more RBs of a subchannel associated with the sidelink shared data channel.

In some examples of the method, apparatuses, and non-transitory computer-readable medium described herein, receiving the sidelink data via the sidelink shared data channel may include operations, features, means, or instructions for rate matching the sidelink shared data channel in one or more sidelink shared data channel symbols other than one or more REs of a subchannel associated with the sidelink shared data channel, where the one or more REs correspond to the data block grid offset.

In some examples of the method, apparatuses, and non-transitory computer-readable medium described herein, receiving the sidelink data via the sidelink shared data channel may include operations, features, means, or instructions for rate matching the sidelink shared data channel in one or more sidelink shared data channel symbols other than one or more frequency resources associated with the set of multiple common locations of the control channel within the control RB grid.

In some examples of the method, apparatuses, and non-transitory computer-readable medium described herein, the data block grid offset indicates a data block grid within the RB set.

A method for wireless communication at a wireless device is described. The method may include identifying a RB set, a set of multiple common DMRS locations within the RB set, and a set of multiple common locations of a control channel within the RB set, transmitting a truncated DMRS sequence via at least a subset of the set of multiple common DMRS locations within the RB set, and transmitting SCI via at least a subset of the set of multiple common locations of the control channel corresponding to the subset of the set of multiple common DMRS locations.

An apparatus for wireless communication at a wireless device is described. The apparatus may include a processor, memory coupled with the processor, and instructions stored in the memory. The instructions may be executable by the processor to cause the apparatus to identify a RB set, a set of multiple common DMRS locations within the RB set, and a set of multiple common locations of a control channel within the RB set, transmit a truncated DMRS sequence via at least a subset of the set of multiple common DMRS locations within the RB set, and transmit SCI via at least a subset of the set of multiple common locations of the control channel corresponding to the subset of the set of multiple common DMRS locations.

Another apparatus for wireless communication at a wireless device is described. The apparatus may include means for identifying a RB set, a set of multiple common DMRS locations within the RB set, and a set of multiple common locations of a control channel within the RB set, means for transmitting a truncated DMRS sequence via at least a subset of the set of multiple common DMRS locations within the RB set, and means for transmitting SCI via at least a subset of the set of multiple common locations of the control channel corresponding to the subset of the set of multiple common DMRS locations.

A non-transitory computer-readable medium storing code for wireless communication at a wireless device is described. The code may include instructions executable by a processor to identify a RB set, a set of multiple common DMRS locations within the RB set, and a set of multiple common locations of a control channel within the RB set, transmit a truncated DMRS sequence via at least a subset of the set of multiple common DMRS locations within the RB set, and transmit SCI via at least a subset of the set of multiple common locations of the control channel corresponding to the subset of the set of multiple common DMRS locations.

In some examples of the method, apparatuses, and non-transitory computer-readable medium described herein, identifying the RB set, the set of multiple common DMRS locations, and the set of multiple common locations of the control channel may include operations, features, means, or instructions for receiving control signaling indicating the RB set, the set of multiple common DMRS locations, the set of multiple common locations of the control channel, or any combination thereof, the control signaling indicating a configuration for the RB set.

Some examples of the method, apparatuses, and non-transitory computer-readable medium described herein may further include operations, features, means, or instructions for identifying a mapping of the truncated DMRS sequence that begins at a common frequency location of the RB set, where transmitting the truncated DMRS sequence may be based on the mapping.

In some examples of the method, apparatuses, and non-transitory computer-readable medium described herein, transmitting the truncated DMRS sequence may include operations, features, means, or instructions for transmitting the truncated DMRS sequence in one or more allocated common RBs of the RB set based on a sidelink resource pool configuration, where the truncated DMRS sequence corresponds to the mapping.

Some examples of the method, apparatuses, and non-transitory computer-readable medium described herein may further include operations, features, means, or instructions for identifying a mapping of the truncated DMRS sequence that begins at a common frequency location of the RB set associated with a first RB offset, where transmitting the truncated DMRS sequence may be based on the mapping.

In some examples of the method, apparatuses, and non-transitory computer-readable medium described herein, the mapping corresponds to a RE offset that may be based on an RB grid associated with the control channel.

In some examples of the method, apparatuses, and non-transitory computer-readable medium described herein, a scrambling identifier (ID) associated with the truncated DMRS sequence may be independent of an RB grid associated with the control channel.

Some examples of the method, apparatuses, and non-transitory computer-readable medium described herein may further include operations, features, means, or instructions for identifying a mapping of the truncated DMRS sequence that begins at a frequency location of a common RB grid, where transmitting the truncated DMRS sequence may be based on the mapping.

In some examples of the method, apparatuses, and non-transitory computer-readable medium described herein, transmitting the SCI may include operations, features, means, or instructions for transmitting the SCI indicating a data block grid offset for a sidelink shared data channel with respect to a common RB grid.

Some examples of the method, apparatuses, and non-transitory computer-readable medium described herein may further include operations, features, means, or instructions for transmitting sidelink data via the sidelink shared data channel based on the data block grid offset, where the data block grid offset indicates a data block grid within the RB set.

In some examples of the method, apparatuses, and non-transitory computer-readable medium described herein, the SCI may be transmitted via a signal having a continuous waveform or an interlaced waveform.

A method for wireless communication at a wireless device is described. The method may include identifying a RB set, a set of multiple common DMRS locations within the RB set, and a set of multiple common locations of a control channel within the RB set, receiving a truncated DMRS sequence via at least a subset of the set of multiple common DMRS locations within the RB set, and receiving SCI via at least a subset of the set of multiple common locations of the control channel corresponding to the subset of the set of multiple common DMRS locations.

An apparatus for wireless communication at a wireless device is described. The apparatus may include a processor, memory coupled with the processor, and instructions stored in the memory. The instructions may be executable by the processor to cause the apparatus to identify a RB set, a set of multiple common DMRS locations within the RB set, and a set of multiple common locations of a control channel within the RB set, receive a truncated DMRS sequence via at least a subset of the set of multiple common DMRS locations within the RB set, and receive SCI via at least a subset of the set of multiple common locations of the control channel corresponding to the subset of the set of multiple common DMRS locations.

Another apparatus for wireless communication at a wireless device is described. The apparatus may include means for identifying a RB set, a set of multiple common DMRS locations within the RB set, and a set of multiple common locations of a control channel within the RB set, means for receiving a truncated DMRS sequence via at least a subset of the set of multiple common DMRS locations within the RB set, and means for receiving SCI via at least a subset of the set of multiple common locations of the control channel corresponding to the subset of the set of multiple common DMRS locations.

A non-transitory computer-readable medium storing code for wireless communication at a wireless device is described. The code may include instructions executable by a processor to identify a RB set, a set of multiple common DMRS locations within the RB set, and a set of multiple common locations of a control channel within the RB set, receive a truncated DMRS sequence via at least a subset of the set of multiple common DMRS locations within the RB set, and receive SCI via at least a subset of the set of multiple common locations of the control channel corresponding to the subset of the set of multiple common DMRS locations.

In some examples of the method, apparatuses, and non-transitory computer-readable medium described herein, identifying the RB set, the set of multiple common DMRS locations, and the set of multiple common locations of the control channel may include operations, features, means, or instructions for receiving control signaling indicating the RB set, the set of multiple common DMRS locations, the set of multiple common locations of the control channel, or any combination thereof, the control signaling indicating a configuration for the RB set.

Some examples of the method, apparatuses, and non-transitory computer-readable medium described herein may further include operations, features, means, or instructions for identifying a mapping of the truncated DMRS sequence that begins at a common frequency location of the RB set, where receiving the truncated DMRS sequence may be based on the mapping.

In some examples of the method, apparatuses, and non-transitory computer-readable medium described herein, receiving the truncated DMRS sequence may include operations, features, means, or instructions for receiving the truncated DMRS sequence in one or more allocated common RBs of the RB set based on a sidelink resource pool configuration, where the truncated DMRS sequence corresponds to the mapping.

Some examples of the method, apparatuses, and non-transitory computer-readable medium described herein may further include operations, features, means, or instructions for identifying a mapping of the truncated DMRS sequence that begins at a common frequency location of the RB set associated with a first RB offset, where receiving the truncated DMRS sequence may be based on the mapping.

In some examples of the method, apparatuses, and non-transitory computer-readable medium described herein, the mapping corresponds to a RE offset that may be based on an RB grid associated with the control channel.

In some examples of the method, apparatuses, and non-transitory computer-readable medium described herein, a scrambling ID associated with the truncated DMRS sequence may be independent of an RB grid associated with the control channel.

Some examples of the method, apparatuses, and non-transitory computer-readable medium described herein may further include operations, features, means, or instructions for identifying a mapping of the truncated DMRS sequence that begins at a frequency location of a common RB grid, where receiving the truncated DMRS sequence may be based on the mapping.

In some examples of the method, apparatuses, and non-transitory computer-readable medium described herein, receiving the SCI may include operations, features, means, or instructions for receiving the SCI indicating a data block grid offset for a sidelink shared data channel with respect to a common RB grid.

Some examples of the method, apparatuses, and non-transitory computer-readable medium described herein may further include operations, features, means, or instructions for receiving sidelink data via the sidelink shared data channel based on the data block grid offset, where the data block grid offset indicates a data block grid within the RB set.

In some examples of the method, apparatuses, and non-transitory computer-readable medium described herein, receiving the SCI may include operations, features, means, or instructions for performing decoding of a set of multiple decoding hypotheses corresponding to a set of multiple control RB grids within the RB set.

Some examples of the method, apparatuses, and non-transitory computer-readable medium described herein may further include operations, features, means, or instructions for performing a channel estimation of the control channel using one or more first DMRS tones other than one or more second DMRS tones at an edge of the control channel.

In some examples of the method, apparatuses, and non-transitory computer-readable medium described herein, the SCI may be received via a signal having a continuous waveform or an interlaced waveform.

A method for wireless communication at a wireless device is described. The method may include identifying a RB set and a set of multiple control RB grids within the RB set, where each control RB grid is offset in frequency relative a respective RB grid of the set of multiple control RB grids, selecting a first control RB grid from the set of multiple control RB grids for transmitting SCI, the first control RB grid indicating a set of multiple locations for a control channel, and transmitting the SCI via at least a subset of the set of multiple locations for the control channel of the first control RB grid.

An apparatus for wireless communication at a wireless device is described. The apparatus may include a processor, memory coupled with the processor, and instructions stored in the memory. The instructions may be executable by the processor to cause the apparatus to identify a RB set and a set of multiple control RB grids within the RB set, where each control RB grid is offset in frequency relative a respective RB grid of the set of multiple control RB grids, select a first control RB grid from the set of multiple control RB grids for transmitting SCI, the first control RB grid indicating a set of multiple locations for a control channel, and transmit the SCI via at least a subset of the set of multiple locations for the control channel of the first control RB grid.

Another apparatus for wireless communication at a wireless device is described. The apparatus may include means for identifying a RB set and a set of multiple control RB grids within the RB set, where each control RB grid is offset in frequency relative a respective RB grid of the set of multiple control RB grids, means for selecting a first control RB grid from the set of multiple control RB grids for transmitting SCI, the first control RB grid indicating a set of multiple locations for a control channel, and means for transmitting the SCI via at least a subset of the set of multiple locations for the control channel of the first control RB grid.

A non-transitory computer-readable medium storing code for wireless communication at a wireless device is described. The code may include instructions executable by a processor to identify a RB set and a set of multiple control RB grids within the RB set, where each control RB grid is offset in frequency relative a respective RB grid of the set of multiple control RB grids, select a first control RB grid from the set of multiple control RB grids for transmitting SCI, the first control RB grid indicating a set of multiple locations for a control channel, and transmit the SCI via at least a subset of the set of multiple locations for the control channel of the first control RB grid.

In some examples of the method, apparatuses, and non-transitory computer-readable medium described herein, identifying the RB set and the set of multiple control RB grids may include operations, features, means, or instructions for receiving control signaling indicating the RB set and the set of multiple control RB grids, the control signaling indicating a configuration for the RB set.

Some examples of the method, apparatuses, and non-transitory computer-readable medium described herein may further include operations, features, means, or instructions for selecting the first control RB grid for transmitting sidelink data via a sidelink shared data channel, the first control RB grid indicating a set of multiple locations for the sidelink shared data channel and transmitting the sidelink data via at least a subset of the set of multiple locations for the sidelink shared data channel of the first control RB grid.

Some examples of the method, apparatuses, and non-transitory computer-readable medium described herein may further include operations, features, means, or instructions for identifying a quantity of offset values associated with the set of multiple control RB grids, where identifying the set of multiple control RB grids may be based on identifying the quantity of offset values.

In some examples of the method, apparatuses, and non-transitory computer-readable medium described herein, identifying the quantity of offset values may include operations, features, means, or instructions for receiving control signaling indicating the quantity of offset values.

A method for wireless communication at a wireless device is described. The method may include identifying a RB set and a set of multiple control RB grids within the RB set, where each control RB grid is offset in frequency relative a respective RB grid of the set of multiple control RB grids, performing decoding of a set of multiple decoding hypotheses corresponding to the set of multiple control RB grids, and outputting SCI decoded via at least a subset of a set of multiple locations of a control channel corresponding to a first control RB grid of the set of multiple control RB grids based on performing the decoding of the set of multiple decoding hypotheses.

An apparatus for wireless communication at a wireless device is described. The apparatus may include a processor, memory coupled with the processor, and instructions stored in the memory. The instructions may be executable by the processor to cause the apparatus to identify a RB set and a set of multiple control RB grids within the RB set, where each control RB grid is offset in frequency relative a respective RB grid of the set of multiple control RB grids, perform decoding of a set of multiple decoding hypotheses corresponding to the set of multiple control RB grids, and output SCI decoded via at least a subset of a set of multiple locations of a control channel corresponding to a first control RB grid of the set of multiple control RB grids based on performing the decoding of the set of multiple decoding hypotheses.

Another apparatus for wireless communication at a wireless device is described. The apparatus may include means for identifying a RB set and a set of multiple control RB grids within the RB set, where each control RB grid is offset in frequency relative a respective RB grid of the set of multiple control RB grids, means for performing decoding of a set of multiple decoding hypotheses corresponding to the set of multiple control RB grids, and means for outputting SCI decoded via at least a subset of a set of multiple locations of a control channel corresponding to a first control RB grid of the set of multiple control RB grids based on performing the decoding of the set of multiple decoding hypotheses.

A non-transitory computer-readable medium storing code for wireless communication at a wireless device is described. The code may include instructions executable by a processor to identify a RB set and a set of multiple control RB grids within the RB set, where each control RB grid is offset in frequency relative a respective RB grid of the set of multiple control RB grids, perform decoding of a set of multiple decoding hypotheses corresponding to the set of multiple control RB grids, and output SCI decoded via at least a subset of a set of multiple locations of a control channel corresponding to a first control RB grid of the set of multiple control RB grids based on performing the decoding of the set of multiple decoding hypotheses.

In some examples of the method, apparatuses, and non-transitory computer-readable medium described herein, identifying the RB set and the set of multiple control RB grids may include operations, features, means, or instructions for receiving control signaling indicating the RB set and the set of multiple control RB grids, the control signaling indicating a configuration for the RB set.

Some examples of the method, apparatuses, and non-transitory computer-readable medium described herein may further include operations, features, means, or instructions for selecting the first control RB grid for decoding sidelink data via a sidelink shared data channel, the first control RB grid indicating a set of multiple locations for the sidelink shared data channel and outputting the sidelink data based on performing decoding on at least a subset of the set of multiple locations for the sidelink shared data channel.

Some examples of the method, apparatuses, and non-transitory computer-readable medium described herein may further include operations, features, means, or instructions for identifying a quantity of offset values associated with the set of multiple control RB grids, where identifying the set of multiple control RB grids may be based on identifying the quantity of offset values.

In some examples of the method, apparatuses, and non-transitory computer-readable medium described herein, identifying the quantity of offset values may include operations, features, means, or instructions for receiving control signaling indicating the quantity of offset values.

DETAILED DESCRIPTION

Some wireless communications systems may support sidelink communications. Additionally, the sidelink communications may support resource block (RB) grid selection such that some user equipments (UEs) may select and use different RB grids for communicating with other UEs. For example, the different RB grids may have different starting and ending points for the associated RBs (e.g., in a frequency domain, in terms of resource elements (REs)). In some cases, when a first UE (e.g., receiving UE) establishes communications with another UE, such as a transmitting UE, the receiving UE may be unaware of a different RB grid used by the transmitting UE. For example, the RB grid of the transmitting UE may not be aligned with the RB grid of the receiving UE, such that the receiving UE may fail to receive part or all of a communication from the transmitting UE.

Techniques described herein may support increased communication reliability and quality when handling RB grid misalignment in sidelink communications. In a first example, communicating UEs may support different RB grids (e.g., within an RB set) and a receiving UE may attempt multiple decoding hypotheses for receiving a sidelink control channel from a transmitting UE, where each hypothesis may correspond to a different RB grid. Based on the decoding results, the UE may use the RB grid associated with a most successful result. In a second example, an RB grid for a sidelink control channel (e.g., a control RB grid) may be common, or aligned (e.g., within an RB set), for the transmitting UE and the receiving UE, such that the receiving UE may receive the sidelink control channel using the common RB grid. Additionally, the control channel may indicate an RB grid for a corresponding sidelink shared channel (e.g., may indicate a data block grid offset for the corresponding RB grid), such that the receiving UE may use the indicated RB grid to receive the sidelink shared channel. In a third example, demodulation reference signals (DMRSs) and RE rate matching for a sidelink control channel may be common, or aligned (e.g., within an RB set), for the transmitting UE and the receiving UE, such that the receiving UE may receive the control channel using the aligned DMRS (e.g., using common DMRS locations within the RB set). In some cases, the control channel may indicate an RB grid used for a corresponding sidelink shared channel, such that the receiving UE may use the indicated RB grid to receive the sidelink shared channel.

Aspects of the disclosure are initially described in the context of wireless communications systems. Aspects of the disclosure are then described in the context of RB configurations and process flows. Aspects of the disclosure are further illustrated by and described with reference to apparatus diagrams, system diagrams, and flowcharts that relate to resource block grid alignment at sidelink nodes.

Figure 1:
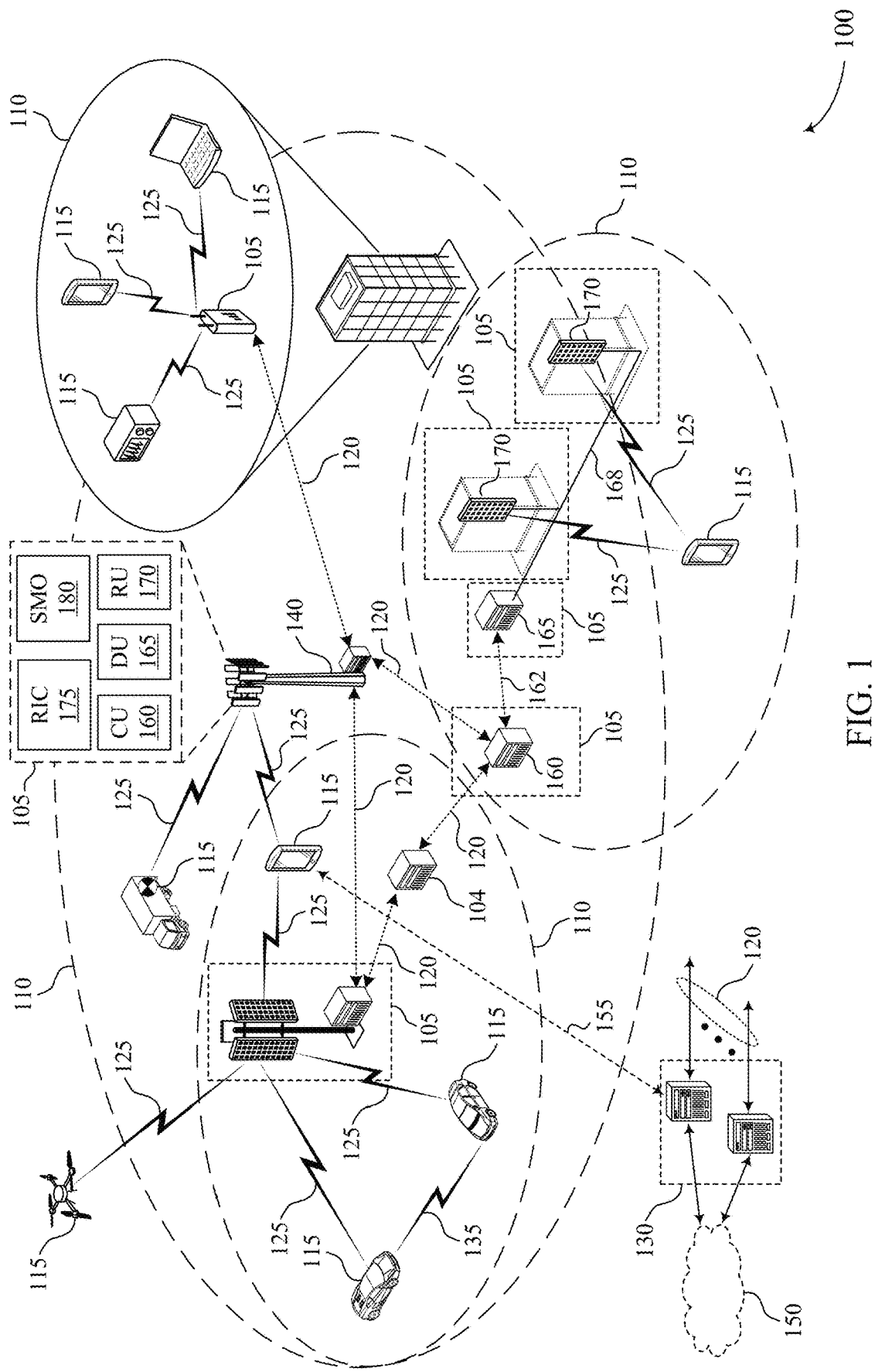
FIG. 1 illustrates an example of a wireless communications system that supports resource block (RB) grid alignment at sidelink nodes in accordance with one or more aspects of the present disclosure.

FIG. 1 illustrates an example of a wireless communications system 100 that supports resource block grid alignment at sidelink nodes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support resource block grid alignment at sidelink nodes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may refer to resources of one symbol period (e.g., a duration of one modulation symbol) and one subcarrier, in which case the symbol period and subcarrier spacing may be inversely related. The quantity of bits carried by each RE may depend on the modulation scheme (e.g., the order of the modulation scheme, the coding rate of the modulation scheme, or both) such that the more REs that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications system 100 may support handling RB grid misalignment for the UEs 115 (e.g., for distributed sidelink nodes). In a first example, a first UE 115 (e.g., a receiving UE 115) may attempt multiple decoding hypotheses (e.g., K_ssb hypotheses) for receiving a control channel from a second UE 115 (e.g., a transmitting UE 115), where each hypothesis may correspond to a different RB grid (e.g., based on a different K_ssb value for the respective RB grid). In a second example, an RB grid associated with the control channel (e.g., a control RB grid) may be common (e.g., shared among UEs 115), or aligned, while selected RB grids associated with the shared channel may not be aligned. The control RB grid may be a common RB grid (e.g., which may be hard coded) and the receiving UE 115 may receive the control channel using the common control RB grid. In a third example, the transmitting UE 115 and the receiving UE 115-b may select RB grids such that the control RB grids may not be aligned and the RB grids associated with shared channel may not be aligned (e.g., the control channel and shared channel may be associated with a same respective RB grid for each UE 115, which may not be aligned across UEs 115). However, the UEs 115 may support common DMRS mapping and RE rate matching for the control channel such that the receiving UE 115 may receive the control channel using the aligned DMRS and REs (e.g., instead of performing blind decoding for different K_ssb hypotheses), even when different control RB grids are used.

Figure 2:
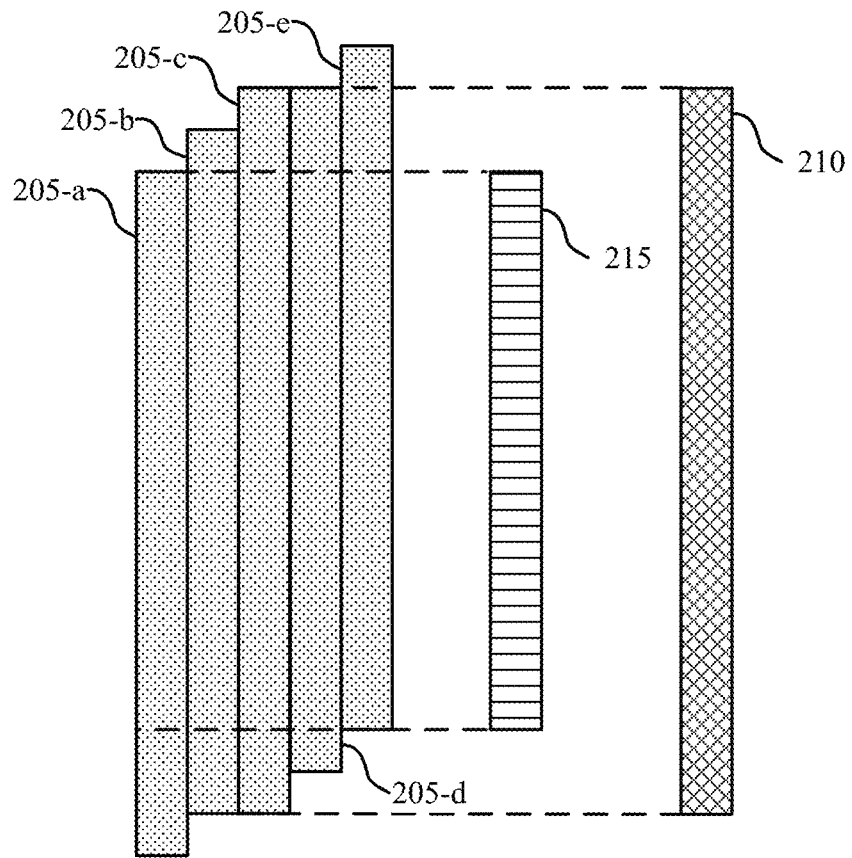
FIG. 2 illustrates an example of an RB configuration that supports resource block grid alignment at sidelink nodes in accordance with one or more aspects of the present disclosure.

FIG. 2 illustrates an example of an RB configuration 200 that supports RB grid alignment at sidelink nodes in accordance with one or more aspects of the present disclosure. The RB configuration 200 may implement or be implemented by aspects of the wireless communications system 100. For example, a first UE 115 may apply a selected RB set 210 for communications with a second UE 115 (e.g., among other examples).

Wireless devices, such as UEs 115, operating in a wireless communications system (e.g., a sidelink communications system) may support multiple RB grids. For example, some UEs 115 may use different RB grids for transmitting signaling, where the different RB grids may have different starting and ending points for the associated RBs (e.g., in a frequency domain, in terms of REs). For example, a transmitting UE 115 may select an RB grid from possible RB set configurations 205. That is, the transmitting UE 115 may select a possible RB set configuration 205-a, a possible RB set configuration 205-b, a possible RB set configuration 205-c, a possible RB set configuration 205-d, or a possible RB set configuration 205-e (e.g., among others).

In some cases, a UE 115 (e.g., the transmitting UE 115) may select the possible RB set configuration 205-c, which may also be referred to as a selected RB set 210. The UE 115 may apply the selected RB set 210 to communicate with one or more other UEs 115, such as a receiving UE 115. However, the receiving UE 115 may also select an RB grid from the possible RB set configurations 205, which grid may have different starting and ending points for the associated RBs than that of the selected RB set 210 (e.g., selected by the transmitting UE 115). As such, a set of common RBs, such as a set of RBs 215 (e.g., an RB set), may exist such that the set of RBs 215 may be common to all of the possible RB set configurations 205 and may support a physical sidelink shared channel (PSSCH) and stage 2 sidelink control information (SCI) (SCI-2).

The set of RBs 215 (e.g., having a minimum RB-set config) may be defined based on a minimum set of RBs among all possible RB set configurations 205 (e.g., per 20 MHz subband), such that a transmitting UE 115 and a receiving UE 115 may have a common understanding of a frequency domain resource allocation (FDRA) (e.g., usable RBs, within the 20 MHz subband) prior to receiving at least one of a remaining minimum system information (RMSI) configuration, a system information block (SIB) configuration, or an RRC configuration. In some cases, the set of RBs 215 (e.g., the minimum RB-set config) may be common for stage 1 SCI (SCI-1) and/or SCI-2 rate matching, such that the decoding of the SCI-1 and SCI-2 (e.g., by any receiving UEs 115) may not depend on a choice of a possible RB set configuration 205. For example, SCI-1 may be rate matched to RBs within one interlace and the set of RBs 215 (e.g., one minimum RB set) such that each UE 115 (e.g., each sidelink node) may be operable to (e.g., know how to) decode a physical sidelink control channel (PSCCH). Additionally, SCI-2 may be rate matched to RBs within interlaces scheduled by SCI-1, RB sets in an RB set gap, and RBs in an RB set gap. In some cases, UEs 115 may rate match the PSSCH around the RBs of the PSCCH in the PSCCH symbols.

In phase 1 communications (e.g., for establishing communications with one or more other UEs 115), UEs 115 (e.g., distributed sidelink nodes) may start communications with one another based on the set of RBs 215 (e.g., default minimum RB-set config). A timing for slot alignment (e.g., or other timing alignment) for phase 1 communications may be provided by a global positioning system (GPS), a network entity 105, or a sidelink UE 115 transmitting one or more sidelink synchronization signal blocks (S-SSBs). Additionally, alignment of the RB grids (e.g., alignment of the possible RB set configurations 205 selected by the UEs 115) may be hard coded at the UEs 115, or may be based on assuming a common configuration. In some cases, the RB set 210 selected by a transmitting UE 115 and an RB set configuration 205 selected by a receiving UE 115 may overlap and may not align (e.g., may not completely align). In such cases, the UEs 115 may rate match the PSSCH and SCI-1 and/or SCI-2 to the set of RBs 215 (e.g., common minimum RB set).

After phase 1 communications, UEs 115 may move to phase 2 communications to continue to establish communications with other UE(s) 115. In some phase 2 communications, UEs 115 (e.g., sidelink nodes) may communicate a message, such as an RMSI message or RRC message, among at least two UEs 115, indicating one or more RB sets to be used and indicating starting and/or ending RBs of each configured RB set. For example, a transmitting UE 115 may indicate, to a receiving UE 115, a selected RB set 210 and the associated starting and/or ending RBs. In such cases, a UE 115 (e.g., the receiving UE 115) may be aware of a setting of another UE 115 (e.g., the transmitting UE 115), which may result in increased efficiency for PSSCH transmissions.

In some cases, dynamic RMSI may indicate a resource pool configuration among UEs 115 (e.g., sidelink nodes) during phase 1 communications, such that the UEs 115 may transition to phase 2 communications. For example, the resource pool configuration indicated by the dynamic RMSI may include at least one of a common point offset (e.g., offsetToPointA), an RB grid offset (e.g., K_ssb), a starting RB for a BWP, a BWP bandwidth, and/or an RB set configuration (e.g., a selected RB set 210 configuration). In some cases, a K_ssb value may indicate a PSSCH RB grid offset if the transmitting UE 115 or the receiving UE 115 chooses to transmit PSSCH in a different RB grid for phase 2 communications. Additionally, the RB set configuration may indicate a start and/or end of each RB set.

In some cases, the RB grids of the UEs 115 may be aligned for phase 1 communications. However, in some cases, the RB grids of the UEs 115 may not be aligned when establishing communications during phase 1 communications. In such cases, a receiving UE 115 may be unaware of a selected RB set 210 used by a transmitting UE 115 and may fail to receive part or all of communication from the transmitting UE 115 (e.g., based on a misalignment in the different RB grids). For example, the UEs 115 may support flexibility of selecting an RB grid offset (e.g., during phase 1 communications), or may be configured with different RB grid offsets (e.g., K_ssb values). In some cases, a transmitting UE 115 may refrain from transmitting an S-SSB and a receiving UE 115 may therefore be unaware of the RB grid offset (e.g., K_ssb assumption) of the transmitting UE 115, such that the RB grids of the UEs 115 may not be aligned. In some other cases, the UEs 115 may not indicate the RB grid offset using on demand RMSI. As described herein, the UEs 115 may have an aligned slot timing. For example, an S-SSB may be used to provide system frame number (SFN) timing, slot index, slot timing, symbol timing, subcarrier spacing, or the like.

In some case, two or more UEs 115 may have different RB grid offsets due to lack of a network entity 105 configuring communications (e.g., in sidelink Mode 2 communications). For example, a network entity 105 may not configure the UEs 115 with a common RB grid offset because the UEs 115 may operate in sidelink Mode 2 (e.g., where the UEs 115 may autonomously select resources). In some other cases, the UEs 115 may select different RB grid offsets based on different device specifications (e.g., based on a vendor, manufacturer, wireless service provider).

Techniques described herein may support handling RB grid misaligned for the UEs 115 (e.g., distributed sidelink nodes).

Figure 3:
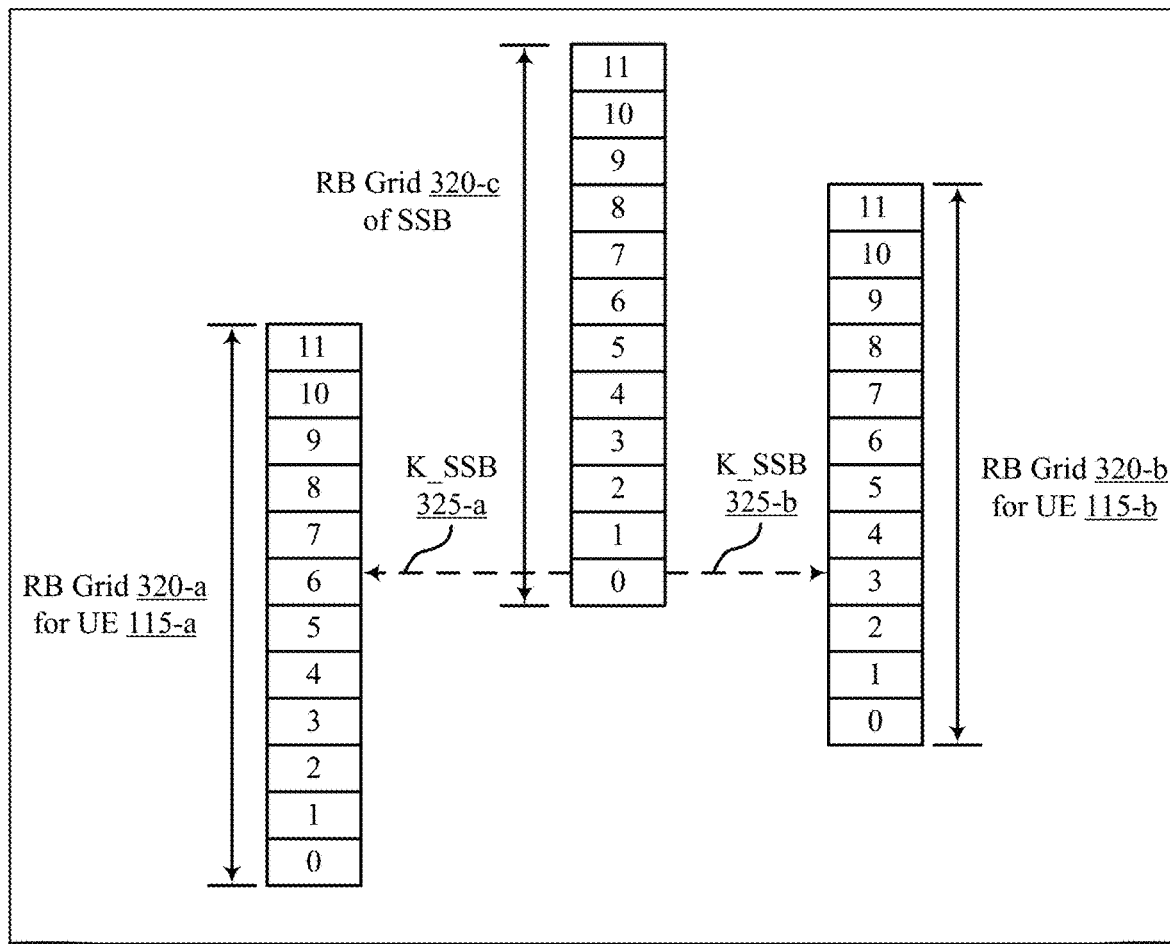
FIG. 3 illustrates an example of a wireless communications system that supports RB grid alignment at sidelink nodes in accordance with one or more aspects of the present disclosure.
Figure 3:
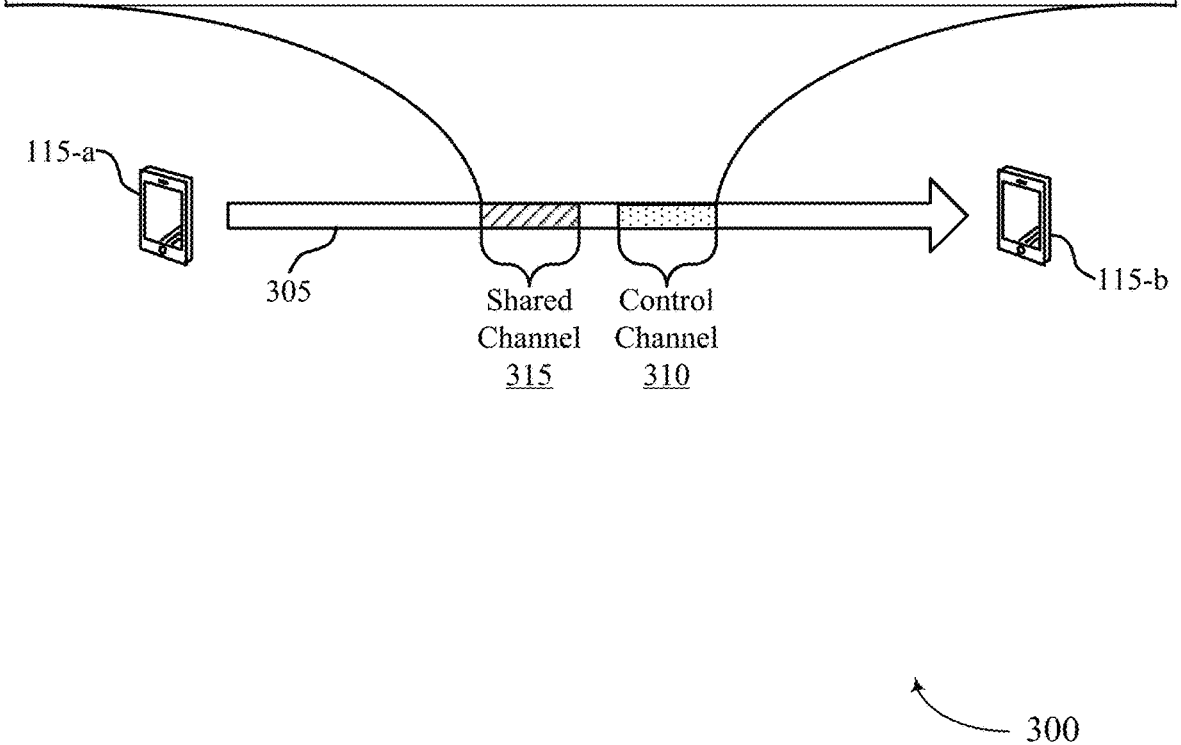

FIG. 3 illustrates an example of a wireless communications system 300 that supports RB grid alignment at sidelink nodes in accordance with one or more aspects of the present disclosure. The wireless communications system 300 may implement or be implemented by aspects of the wireless communications system 100 and RB configuration 200. For example, wireless communications system 300 may include a UE 115-*a* and UE 115-*b*, which may represent examples of UEs 115 as described herein, including with reference to FIGS. 1 and 2. In some cases, the UEs 115 may communicate via a communication link 305, which may represent an example of a communication link 135 as described herein, including with reference to FIG. 1. For example, the UE 115-*a* and the UE 115-*b* may communicate over the communication link 305 via a control channel 310 and a shared channel 315.

In some cases, a UE 115-*a* may select an RB grid 320-*a* (e.g., from an RB set, such as described with reference to FIG. 2) and a UE 115-*b* may select an RB grid 320-*b* (e.g., from the RB set), such that the RB grid 320-*a* and the RB grid 320-*b* may not be aligned (e.g., due to different starting and ending points for the associated RBs of the respective grids). For example, the RB grid 320-*a* may be associated with a K_ssb 325-*a* (e.g., a first RB grid offset) while the RB grid 320-*b* may be associated with a K_ssb 325-*b* (e.g., a second RB grid offset). The K_ssb 325-*a* may represent an RB grid offset of 6 REs compared to an RB grid 320-*c* of an SSB (e.g., S-SSB) common to both UEs 115 while the K_ssb 325-*b* may represent an RB grid offset of 3 REs compared to the RB grid 320-*c* of the common SSB.

In some cases, such as when establishing communications between the UE 115-*a* and the UE 115-*b* (e.g., in phase 1 communications, where K_ssb may be indicated for phase 2 communications), the UE 115-*b* (e.g., a receiving UE 115) may be unaware of the RB grid 320-*a* used by the UE 115-*a* (e.g., a transmitting UE 115). As such, the UE 115-*b* may fail to receive part or all of a communication (e.g., a control channel 310 and associated shared channel 315) from the UE 115-*a* (e.g., based on misalignment of the RB grid 320-*a* and the RB grid 320-*b*).

Techniques described herein may support handling RB grid misalignment for the UEs 115-*a* and 115-*b* (e.g., for distributed sidelink nodes). In a first example, the UE 115-*b* may attempt multiple decoding hypotheses (e.g., K_ssb hypotheses) for receiving the control channel 310 from the UE 115-*a* (e.g., based on the RB grid 320-*a* and the RB grid 320-*b* not being aligned), where each hypothesis may correspond to a different RB grid 320 of the RB set (e.g., based on a different K_ssb value for the respective RB grid 320). Based on the decoding results, the UE 115-*b* may use the RB grid 320 (e.g., RB grid 320-*a*) associated with a most successful result for decoding the control channel 310. The UE 115-*b* may use the same RB grid 320 (e.g., RB grid 320-*a*) for decoding the associated shared channel 315 (e.g., may use the successful hypothesis for the shared channel 315).

In a second example, an RB grid 320 (e.g., for the UEs 115-*a* and 115-*b*, among other UEs 115) associated with the control channel 310 (e.g., a control RB grid) may be common (e.g., shared among UEs 115, for the RB set), or aligned, while the selected RB grids 320 (e.g., RB grids 320-*a* and 320-*b*) associated with the shared channel 315 may not be aligned. The RB grid 320 associated with the control channel 310 may be a common RB grid 320 (e.g., which may be hard coded or configured via signaling) and the UE 115-*b* may receive the control channel using the common RB grid 320 (e.g., using the control RB grid). In some cases, the control channel 310 may indicate an RB grid 320 used for the shared channel 315 (e.g., RB grid 320-*a*), such that the UE 115-*b* may use the indicated RB grid 320 to receive the shared channel 315. For example, SCI (e.g., SCI-1) may indicate an RB grid offset (e.g., a K_ssb 325, such as K_ssb 325-*a*) for the shared channel 315 (e.g., a data block grid offset) such that the UE 115-*b* may adjust decoding of the shared channel 315 based on the indicated K_ssb 325 (e.g., using the associated RB grid 320, such as RB grid 320-*a*).

In a third example, the UE 115-*a* and the UE 115-*b* may select RB grids 320 (e.g., RB grids 320-*a* and 320-*b*, from the RB set) such that the RB grids 320 associated with the control channel 310 may not be aligned and the RB grids 320 associated with shared channel 315 may not be aligned (e.g., the control channel and shared channel may be associated with a same respective RB grid for each UE 115, which may not be aligned across UEs 115). However, the UEs 115 may support common DMRS mapping and RE rate matching (e.g., common locations for DMRS) for the control channel 310 (e.g., DMRS mapping and RE rate matching may be aligned) such that the UE 115-*b* may receive the control channel 310 using the aligned DMRS and REs (e.g., instead of performing blind decoding for different K_ssb hypotheses), even when different RB grids 320 are used for the control channel 310. In such cases, channel estimation and control channel decoding may not depend on the RB grids 320 associated with the control channel 310. In some cases, the control channel 310 may indicate an RB grid 320 used for the shared channel 315 (e.g., via a data block grid offset), such that the UE 115-*b* may use the indicated RB grid 320 to receive the shared channel 315. For example, SCI (e.g., SCI-1) may indicate an RB grid offset (e.g., K_ssb 325) for the shared channel 315 such that the UE 115-*b* may adjust the shared channel 315 decoding based on the indicated K_ssb 325.

In the first example described herein, the UE 115-*a* and the UE 115-*b* may select RB grids 320 such that the selected RB grids 320 (e.g., the RB grid 320-*a* selected by the UE 115-*a* and the RB grid 320-*b* selected by the UE 115-*b*) associated with the control channel 310 may not be aligned (e.g., on the RB level) and the selected RB grids 320 associated with shared channel 315 may not be aligned. For example, the UE 115-*a* may transmit signaling on the control channel 310 based on the RB grid 320-*a* and the UE 115-*b* may monitor the control channel 310 based on the RB grid 320-*b* (e.g., instead of decoding on the RB grid 320-*a*), which may result in the UE 115-*b* failing to receive part or all of the transmission. As such, the UE 115-*b* may attempt multiple decoding hypotheses (e.g., hypotheses based on different RB grid assumptions) for receiving the control channel 310 from the UE 115-*a* (e.g., where the shared channel 315 may be assumed to be on a same RB grid 320 as the control channel 310). For example, the UE 115-*b* may attempt decoding based on different RB grid assumptions, or different K_ssb values 325, such as the K_ssb 325-*a* and the K_ssb 325-*b* (e.g., among other K_ssb values). Such decoding may support monitoring for transmissions from different transmitting UEs 115 on different RB grids 320.

In some examples, the UE 115-*b* may be associated with a quantity of decoding hypotheses to attempt (e.g., based on a UE capability). As an illustrative example, the UE 115-*b* may attempt 12 decoding hypotheses (e.g., based on 12 possible K_ssb values). However, the UE 115-*b* may not support performing such a quantity of decoding hypotheses (e.g., based on a UE capability) and may attempt performing, for the control channel 310, a quantity of decoding hypotheses based on the capability of the UE 115-*b* (e.g., may attempt X decoding hypotheses). Based on the decoding result of the control channel 310, the UE 115-*b* may use an RB grid 320 associated with a most successful result and may decode the shared channel 315 based on the RB grid 320. In some cases, the network (e.g., a network entity 105, signaling from a network entity 105) or a wireless communications standard may limit a quantity of possible K_ssb values (e.g., K_ssb values available for selection by the UEs 115) to reduce a number of hypotheses processed by each UE 115 when receiving a control channel 310 (e.g., to reduce a complexity of decoding the control channel 310 based on all of the available K_ssb values).

Figure 4:
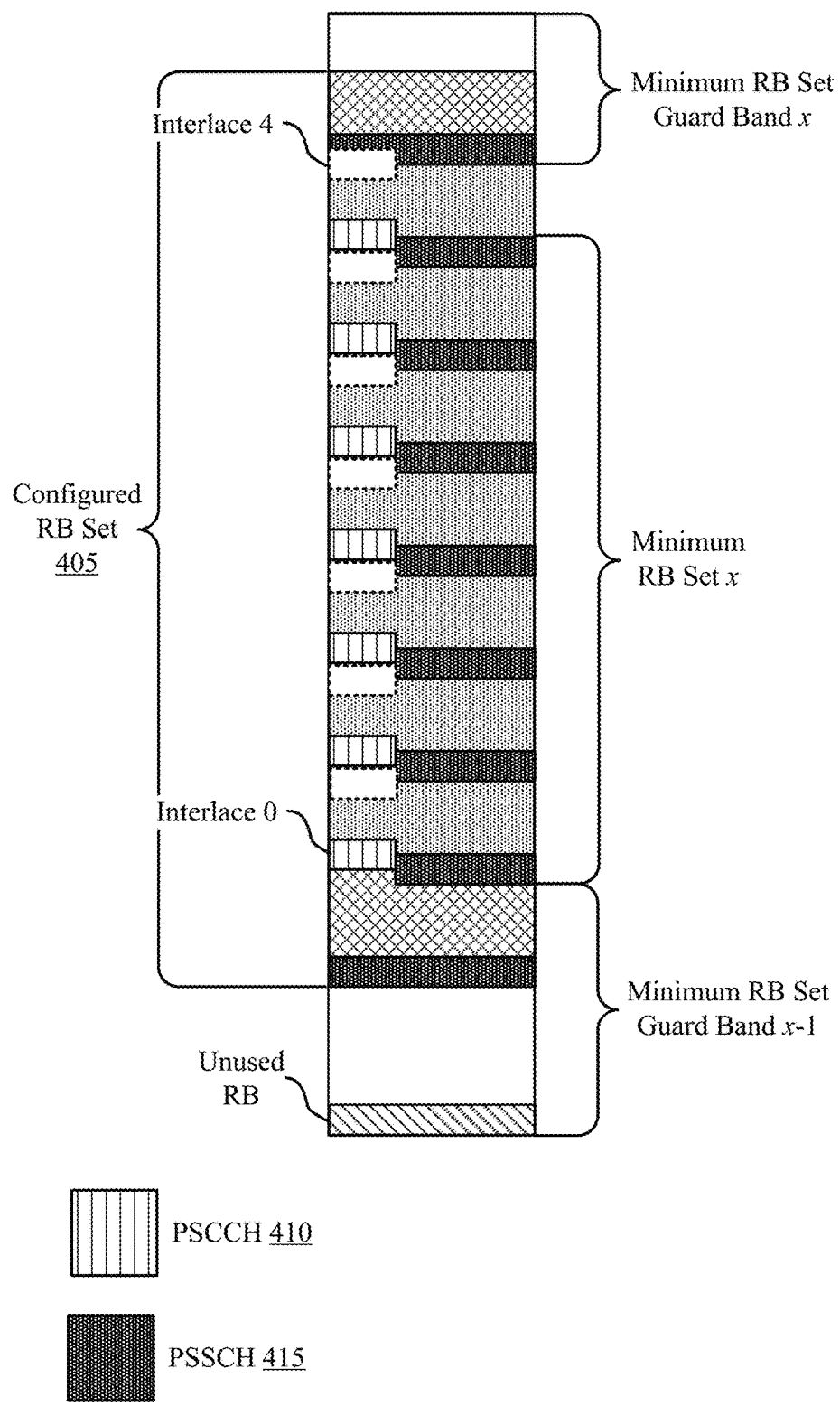
FIGS. 4 through 7 illustrate examples of RB configurations that support RB grid alignment at sidelink nodes in accordance with one or more aspects of the present disclosure.

FIG. 4 illustrates an example of an RB configuration 400 that supports RB grid alignment at sidelink nodes in accordance with one or more aspects of the present disclosure. The RB configuration 400 may implement or be implemented by aspects of the wireless communications system 100, the RB configuration 200, or the wireless communications system 300. For example, the RB configuration 400 may be implemented by UEs 115 as described herein, including with reference to FIGS. 1-3. In some cases, as described with reference to FIG. 3, UEs 115 (e.g., sidelink nodes) in a network may be configured to share a common RB grid for PSCCH (e.g., while allowing each of the UEs 115 to choose a respective RB grid (e.g., K_ssb) for PSSCH transmission).

For example, UEs 115 may be configured to share a configured RB set 405 (e.g., a control RB grid, associated with a minimum or common RB set) for PSCCH transmissions. In some cases, the configured RB set 405 (e.g., control RB grid) may be associated with a minimum RB set (e.g., minimum RB set x) as described herein, which may further be associated with guard bands (e.g., minimum RB set guard band x and minimum RB set guard band x-1). In some cases, the common RB grid for the PSCCH 410 may be preconfigured (e.g., by a wireless communications standard) or may be indicated by a network entity 105. Each UE 115 may select a respective RB grid offset (e.g., K_ssb) for PSSCH 415 (e.g., a data block grid offset), which may not be common to the UEs 115 (e.g., each UE 115 may have the flexibility to select a different RB grid offset).

A transmitting UE 115 may indicate, to a receiving UE 115 via SCI (e.g., SCI-1), a selected RB grid offset (e.g., K_ssb, data block grid offset) for the PSSCH 415 (e.g., so that the receiving UE 115 may identify the transmitting UE 115). Based on transmission of SCI-1 over the minimum RB set (e.g., minimum RB set design) and the common RB grid (e.g., configured RB set 405), each sidelink node (e.g., each UE 115) may decode each other sidelink node's PSCCH transmissions (e.g., if the PSCCH 410 is transmitted in an overlapping RB set, such as configured RB set 405).

The indication (e.g., in SCI-1) of the PSSCH RB grid offset (e.g., an RE offset) may be with respect to the common RB grid for the PSCCH 410, such that a frequency domain resource allocation (FDRA) (e.g., with respect to the RB grid for the PSSCH 415) in SCI-1 may be usable by a receiving UE 115. If the PSSCH RB grid offset is not indicated in SCI-1, the receiving UE 115 may be unaware of which RB grid to use (e.g., for PSSCH reception) and may consider that the PSCCH does not identify the transmitting UE 115.

As illustrated in FIG. 4, in some cases, the PSSCH 415 may rate match around PSCCH REs in PSCCH symbols, and, in some cases, the PSSCH rate matching may avoid RBs and/or REs overlapping with potential PSCCH RBs. In some cases, there may be five options for PSCCH location within an RB, as illustrated by interlace 0 through interlace 4.

Figure 5:
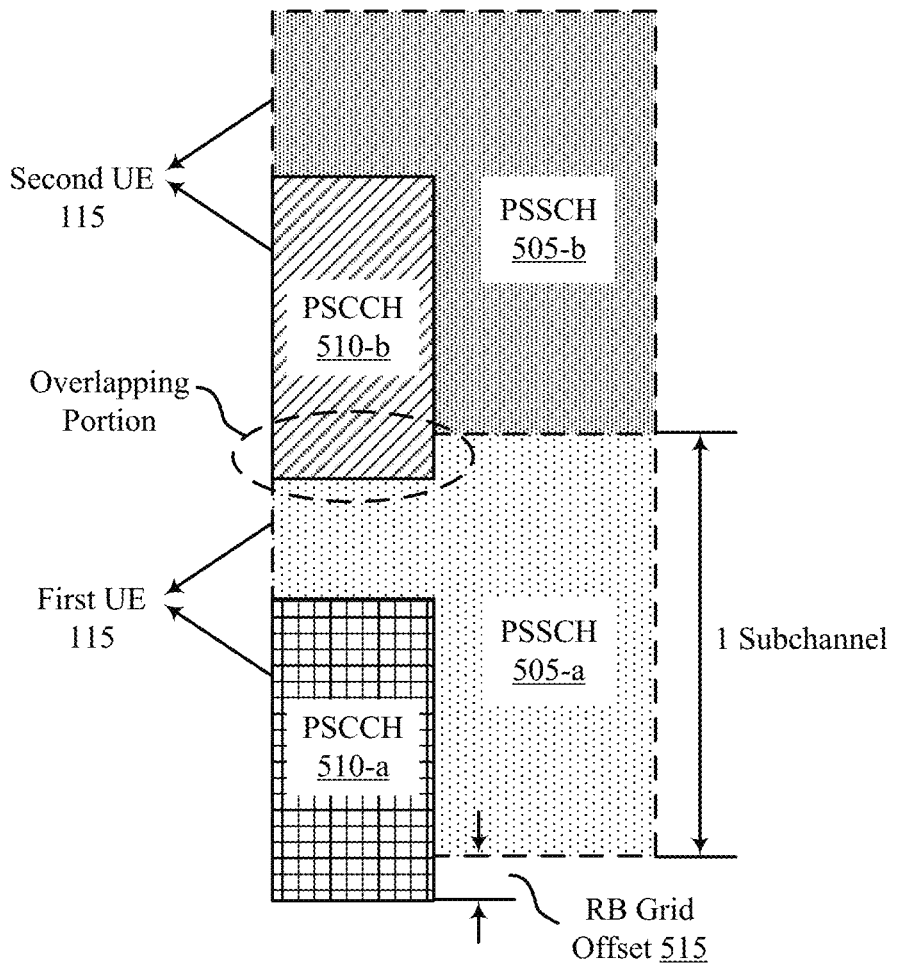

FIG. 5 illustrates an example of an RB configuration 500 that supports RB grid alignment at sidelink nodes in accordance with one or more aspects of the present disclosure. The RB configuration 500 may implement or be implemented by aspects of the wireless communications system 100, the RB configuration 200, the wireless communications system 300, or the RB configuration 400. For example, the RB configuration 500 may be implemented by UEs 115 as described herein, including with reference to FIGS. 1-4. As described herein with reference to FIGS. 3 and 4, UEs 115 may share a same RB grid (e.g., RB grid offset, K_ssb) for PSCCH transmissions (e.g., a control RB grid within an RB set), where the RB grid for a PSCCH 510 may be different from an RB grid associated with a corresponding PSSCH 505 (e.g., because a UE 115 may select an RB grid, or RB grid offset, for the PSSCH 505). Further, RB grids for PSSCH transmissions may differ among some UEs 115 (e.g., based on UE selection of an RB grid for the PSSCH 505, based on different data block grid offsets).

Because the PSSCH 505 and PSCCH 510 may be on different RB grids, rate matching for the PSCCH 510 may be relatively more complex. For example, a PSSCH 505 on an edge RB of a subchannel may interfere with another PSCCH 510 (e.g., a PSCCH 510 transmitted by a different UE 115) in an adjacent subchannel (e.g., may interfere with the PSCCH 510 in PSCCH symbols). UEs 115 (e.g., at least a first UE 115 and a second UE 115) may use a common RB grid for the PSCCH 510 such that a PSCCH 510-a transmitted by the first UE 115 may not interfere with a PSCCH 510-b transmitted by the second UE 115 (e.g., transmitted in an adjacent subchannel). However, the first UE 115 may transmit a PSSCH 505-a which may interfere (e.g., on the edge of a subchannel) with the PSCCH 510-b transmitted by the second UE 115.

In one example, an RB grid (e.g., common or control RB grid) for the PSSCH 505 may use a first RB grid offset 515 (e.g., K_ssb of 11) while an RB grid for the PSCCH 510 (e.g., one or both PSSCHs 505) may use a second RB grid offset 515 (e.g., K_ssb of 0). As such the PSSCH 505-a transmitted by the first UE 115 may rate match around a potential PSCCH 510-b (e.g., transmitted by the second UE 115) in a different RB grid.

To avoid interference between the PSCCH 510 and PSSCH 505 (e.g., due to RB grid misalignment), UEs 115 may refrain from rate matching a PSSCH 505 in a last RB of a last allocated subchannel (e.g., which may be used by the PSCCH 510 of another UE 115). For example, the first UE 115 may refrain from rate matching the PSSCH 505-a in a last RB of a last allocate subchannel (e.g., overlapping with PSCCH 510-b) such that the PSSCH 505-a may avoid causing interference with the PSCCH 510-b (e.g., due to RB grid misalignment). In some cases, refraining from rate matching the PSSCH 505-a in the edge RB may leave a margin to avoid causing interference with the PSCCH 505-b (e.g., scheduled in a different subchannel but with a different K_ssb).

In some cases, UEs 115 may refrain from rate matching a quantity of REs (e.g., X REs) of a last allocated subchannel of a PSSCH 505, where a K_ssb of the RB grid for an overlapping PSCCH 510 with regards to the RB grid of the PSSCH 505 may be equal to the quantity of REs (e.g., where the calculation may be based on the common RB grid). For example, the first UE 115 may refrain from rate matching the PSSCH 505-a to 11 REs of a last allocated subchannel, where a K_ssb of the RB grid for the PSCCH 510-a with regards to the RB grid of the PSSCH 505-a is 11. In some cases (e.g., for non-interlace waveforms), a negative value of X may be supported, and no special handling may be performed (e.g., no refraining from rate matching), because the PSCCH 510 may be fully within with the PSSCH 505. In some other cases (e.g., for interlace waveforms, as illustrated in FIG. 4), UEs 115 may refrain from rate matching RBs or REs which may be used by any potential PSCCH interlace resources. For example, as shown in FIG. 4, a PSSCH in an interlace 0 may avoid PSCCH REs in an interlace 4.

In some cases, a UE 115 may TDM a PSSCH 505 with symbols of a PSCCH 510. In such cases, resources of the PSSCH 505 may map to a symbol after the PSCCH 510 symbols (e.g., similar to physical downlink control channel (PDCCH) and physical downlink shared channel (PDSCH), which may avoid power variation with more than one PSSCH interlace). Additionally, in such cases, the UE 115 may support different RB grids on different symbols (e.g., may support a subset of RB grids on each symbol), such that a PSSCH RB grid and a PSCCH RB grid may not overlap in time.

Figure 6:
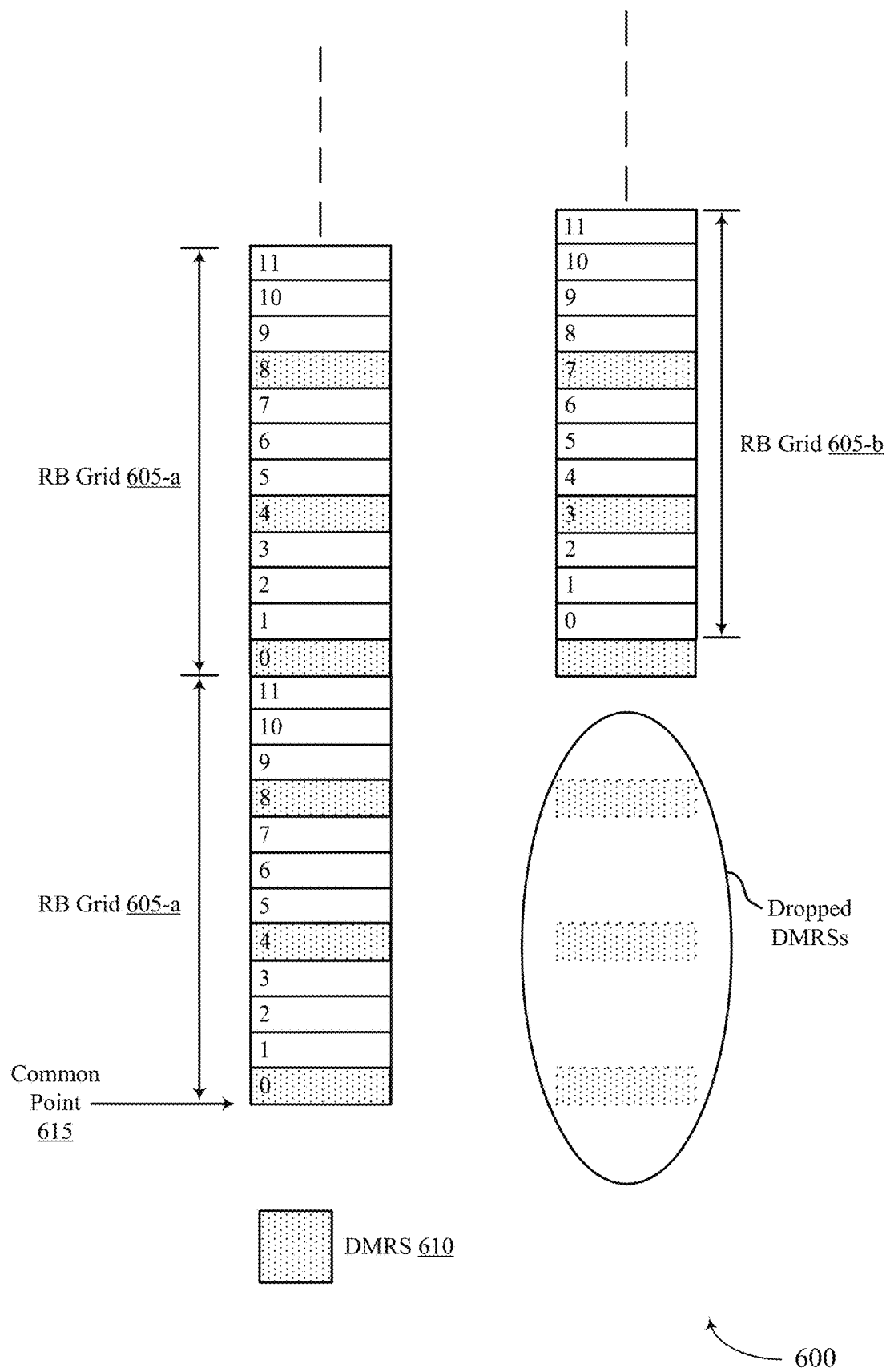

FIG. 6 illustrates an example of an RB configuration 600 that supports RB grid alignment at sidelink nodes in accordance with one or more aspects of the present disclosure. The RB configuration 600 may implement or be implemented by aspects of the wireless communications system 100, the RB configuration 200, or the wireless communications system 300. For example, the RB configuration 600 may be implemented by UEs 115 as described herein, including with reference to FIGS. 1-5. In some cases, UEs 115 may select RB grids 605 (e.g., within an RB set) such that the selected RB grids 605 associated with a sidelink control channel may not be aligned across some UEs 115 and the selected RB grids 605 associated with a sidelink shared channel may not be aligned across some UEs 115. However, the UEs 115 may support common DMRSs 610 (e.g., DMRS alignment) for the sidelink control channel.

DMRS 610 tones of a PSCCH may be located in REs (e.g., certain REs) for each RB, such that if there is a difference in RB grid (e.g., across UEs 115), the DMRSs 610 may not be aligned). In some cases (e.g., when using a direct Uu link with a network entity 105), a DMRS 610 sequence may start from an RB (e.g., common RB) at an offset from a common point 615 (e.g., an RB indicated by an offset-ToPointA), where a truncated DMRS 610 sequence may be transmitted (e.g., limited to transmission) in allocated RBs.

In some cases, a first UE 115 may select an RB grid 605-a for a PSCCH (e.g., and associated PSSCH) and a second UE 115 may select an RB grid 605-b for the PSCCH which may result in misalignment of the RB grids 605 for the PSCCH. For example, the first UE 115 may select a K_ssb of 11 for a PSCCH RB grid and the second UE 115 may select a K_ssb of 10 for a PSCCH RB grid. However, the UEs 115 may implement a design which may support channel estimation and PSCCH decoding without knowing the PSCCH RB grid offset of the other UE 115. For example, the UEs 115 may share DMRS 610 mapping and PSCCH rate matching such that decoding of the PSCCH may be supported by the UEs 115 (e.g., in spite of the different PSCCH RB grids). Such a design may be applicable for continuous waveform (e.g., non-interlaced waveform) or for a full, interlaced waveform.

In a first example, the UEs 115 may share a common RB offset (e.g., offsetToPointA) from a common point 615 such that a DMRS 610 sequence for each UE 115 may be aligned (e.g., at an RB level, may share common DMRS locations within an RB set). For example, the RB offset may indicate an RB offset of a 0th common RB to a 0th RB of an SSB (e.g., to the common point 615) and the DMRS 610 sequence mapping may start with the 0th common RB. In some cases, a UE 115 (e.g., sidelink node) may transmit a truncated DMRS 610 sequence in the allocated common RB which may depend on a sidelink resource pool configuration and an RB set configuration. As an illustrative example, the RB grid offset of the RB grid 605-a may be 11 (e.g., for DMRS 610 mapping reference) while the RB grid offset of the RB grid 605-b may be 10. However, the first UE 115 and the second UE 115 may share a common RB offset from a common point 615 such that the second UE 115 may transmit DMRS 610 with a-1 RE offset which may result in alignment of the DMRS 610 sequence for each UE 115 (e.g., may result in transmitting the DMRS 610 sequence in common DMRS locations for each UE 115). The first and/or second UE 115 may perform channel estimation and PSCCH decoding based on the DMRS 610 sequence alignment and RE level alignment (e.g., without knowing the RB grid offset of the PSCCH of the other UE 115).

In a second example, PSCCH DMRS 610 may be aligned regardless of RB grid selection by the UEs 115 (e.g., DMRS may be located in common DMRS locations of an RB set), such that channel estimation may be performed without knowledge of the respective RB grid offsets. For example, a DMRS 610 sequence mapping may begin at the common point 615 (e.g., a point A) with a maximum RB grid offset value (e.g., a maximum K_ssb) and each UE 115 (e.g., sidelink node) may truncate DMRS 610 within a respective subchannel, configured RB set, and RB grid 605 configuration (e.g., DMRS 610 RE offset may be a function of RB grid 605). As an illustrative example, the first UE 115 operating using RB grid 605-a and the second UE 115 operating using RB grid 605-b may both map a common DMRS 610 based on the common point 615 (e.g., point A).

For example, the first UE 115 may select an RB grid 605-a with an RB grid offset of 11 and may map DMRSs 610 in an RE 0, an RE 4, and an RE 8 of each RB. The second UE 115 may select an RB grid 605-b with an RB grid offset of 11-x and may map DMRSs 610 in an RE (-x), an RE (4-x), and an RE (8-x) of each RB (e.g., where x is subject to a modulo 12 operation). In the example where the second UE 115 selects an RB grid offset of 10, the second UE 115 may map DMRSs 610 in an RE-1, an RE 3, and an RE 7 of each RB.

In some cases, the UEs 115 may truncate a first [x/4] DMRS 610 sequence elements and start an $[x/4]^{th}$ DMRS 610 sequence element in a 0th common RB (e.g., which common RB may be based on RB allocation). For example, a UE 115 may select an RB grid 605 with an RB grid offset of 10. As such, the DMRS 610 may be in an RE 1, an RE 5, and an RE 9 of each RB, and the $0^{th}$ common RB may start with a $1^{st}$ DMRS 610 sequence element (e.g., dropping a $0^{th}$ DMRS 610 sequence element). Further, the UE 115 may add an additional DMRS 610 sequence element in a last common RB and a PSCCH transmission may start at a $1^{st}$ common RB.

In some cases, a receiving UE 115 and a transmitting UE 115 may be configured with different RB grids, such as the RB grid 605-a and the RB grid 605-b (e.g., the receiving UE 115 may not know the RB grid 605 of the transmitting UE 115 in phase 1 communications via a minimum RB set). In such cases, the receiving UE 115 may ignore DMRS 610 tones on edge RBs in a respective RB grid configuration (e.g., RB set) for channel estimation. In some cases, a scrambling identifier (ID) of the DMRS 610 tones may not be RB grid 605 dependent (e.g., rather the scrambling ID may be absolute), which may result in sharing a channel estimation for different RB grid 605 hypotheses.

Figure 7:
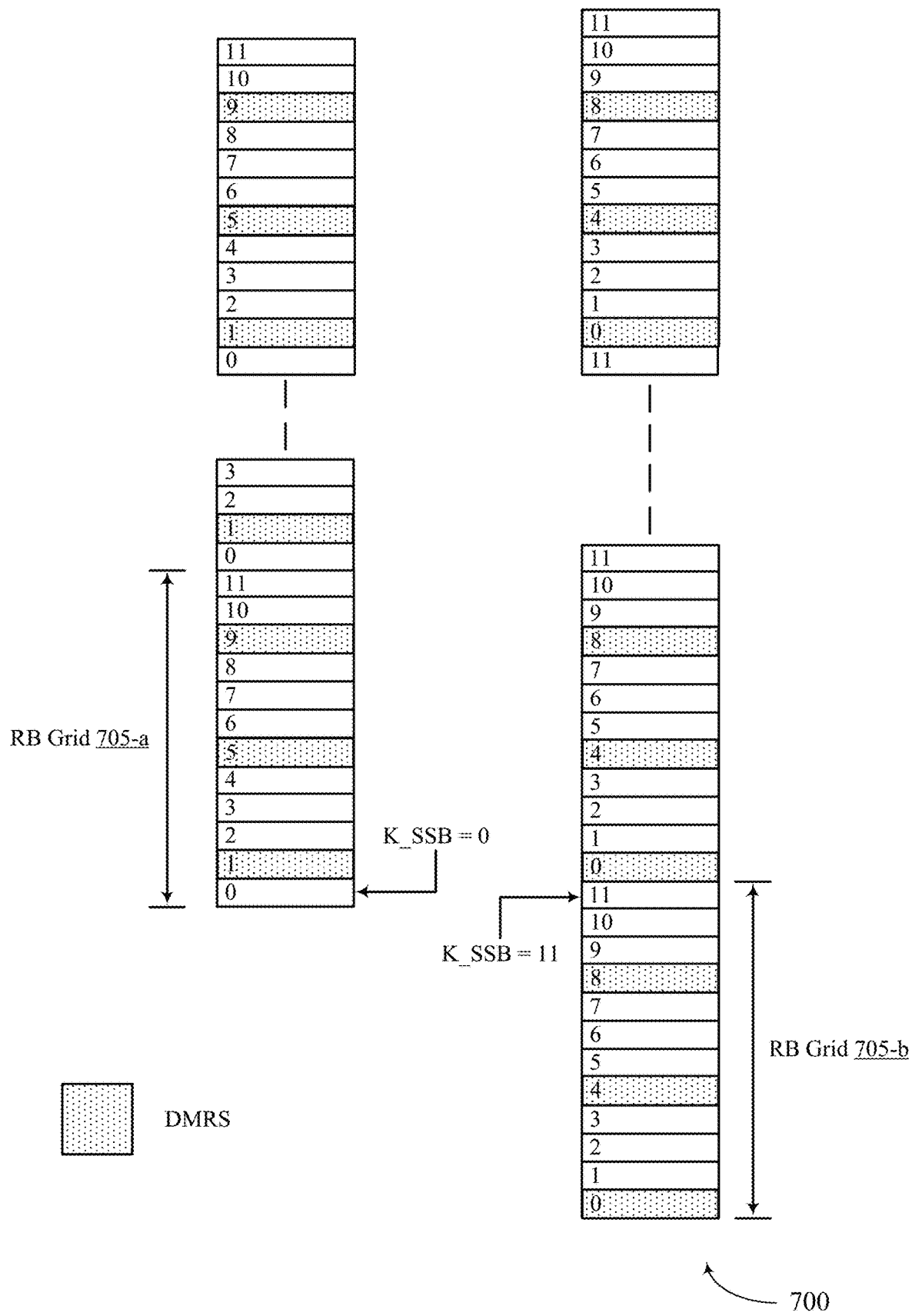

FIG. 7 illustrates an example of an RB configuration 700 that supports RB grid alignment at sidelink nodes in accordance with one or more aspects of the present disclosure. The RB configuration 700 may implement or be implemented by aspects of the wireless communications system 100, the RB configuration 200, the wireless communications system 300, or the RB configuration 600. For example, the RB configuration 700 may be implemented by UEs 115 as described herein, including with reference to FIGS. 1-6. For example, a UE 115 may perform rate matching of a PSCCH or a PSSCH based on a common RB grid reference (e.g., where a starting point for PSCCH tone rate matching may not be RB grid dependent).

For example, a fixed starting point may be selected in a common reference RB grid 705-a and the rate matching may wrap around from that point. For example, a transmitting UE 115 may be configured with an RB grid 705-b with a K_ssb equal to 11 and may identify the common reference RB grid 705-a with a K_ssb equal to 0. The transmitting UE 115 may perform PSCCH tone rate matching based on the RB grid 705-a (e.g., with K_ssb equal to 0) and wrap around. As such, the tone rate matching may start with an $11^{th}$ RE in a $0^{th}$ allocated RB, continue with the following RBs, and wrap around back to a $0^{th}$ RE of the $0^{th}$ allocated RB.

In some cases, a decoder (e.g., an optimum decoder) at a receiving UE 115 may attempt multiple decoding hypothesis on K_ssb when decoding a control channel (e.g., PSCCH) when the K_ssb of the transmitting UE 115 is not known. In some other cases, the receiving UE 115 may ignore edge tones (e.g., an ambiguous portion) of an frequency allocation by puncturing for channel estimation and PSCCH decoding (e.g., trade off performance with a number of decoding). As an illustrative example, the receiving UE 115 may extract M-1 RBs based on the reference RB grid 705-*a* with the K_ssb equal to 0, if the PSCCH is configured with M-1 RBs. If the RB grid 705-*b* of the transmitting UE 115 is associated with a K_ssb equal to x (e.g., 11), 12 edge tones at both ends of the frequency allocation may be punctured, such that x (e.g., 11) tones may be punctured on the bottom and 12-x tones (e.g., 1 tone) may be punctured on the top.

In some cases, the transmitting UE 115 may indicate the K_ssb (e.g., RB grid offset, data block grid offset) of the RB grid 705-*b* via SCI (e.g., SCI-1) such that the receiving UE may read the K_ssb indication in the SCI, identify the RB grid 705-*b* configuration, and perform shared channel (e.g., PSSCH) decoding.

Figure 8:
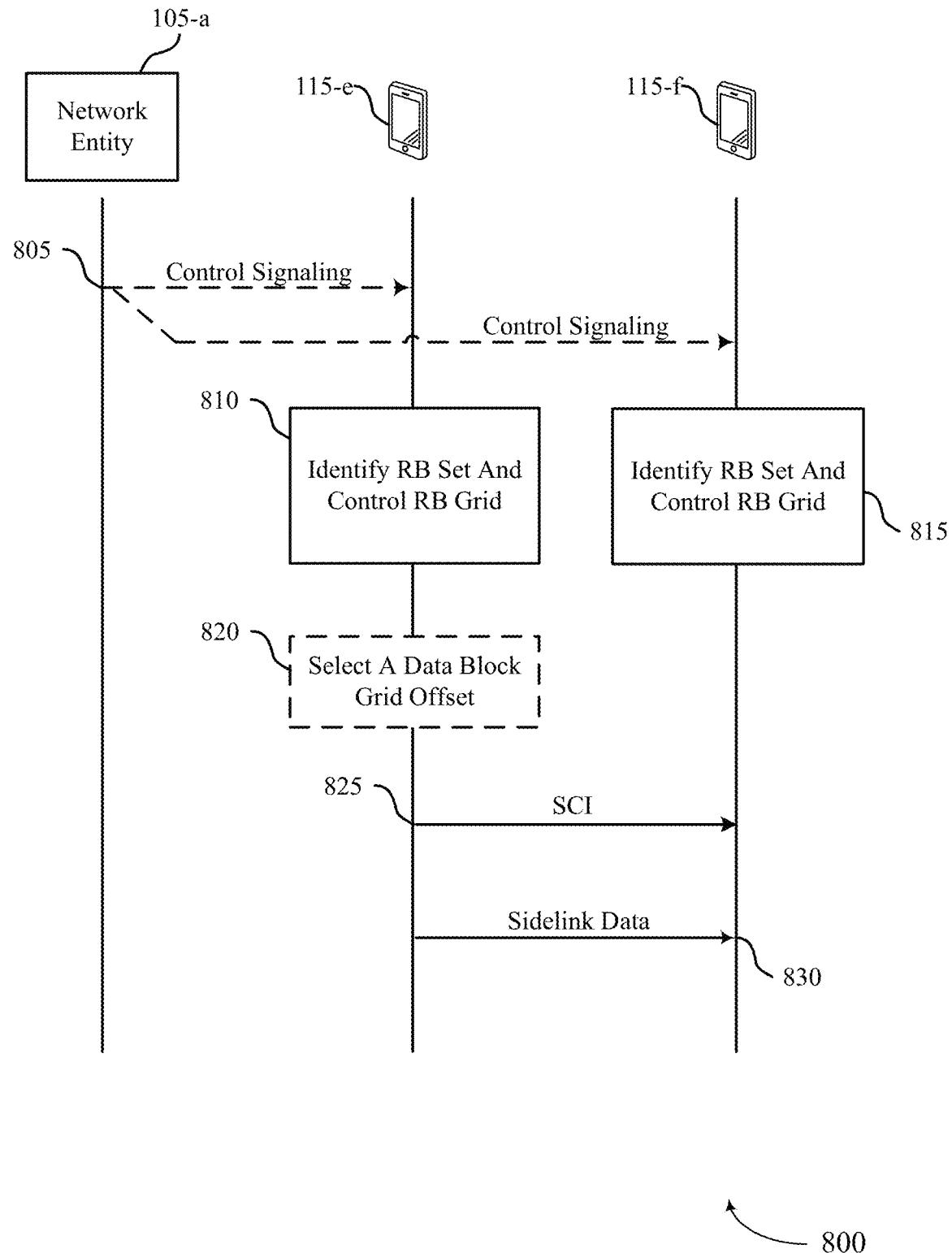
FIGS. 8 through 10 illustrate examples of process flows that support RB grid alignment at sidelink nodes in accordance with one or more aspects of the present disclosure.

FIG. 8 illustrates an example of a process flow 800 that supports RB grid alignment at sidelink nodes in accordance with one or more aspects of the present disclosure. The process flow 800 may implement or be implemented by aspects of the wireless communications system 100, the RB configuration 200, or the wireless communications system 300, the RB configuration 400, or the RB configuration 500. For example, process flow 800 may be implemented by a UE 115-*e*, a UE 115-*f*, and a network entity 105-*a*, which may be examples of UEs 115 and a network entity 105 described with reference to FIGS. 1-7.

In the following description of process flow 800, the operations may be performed in a different order than the order shown, or the operations performed by UE 115-*e*, UE 115-*f*, and network entity 105-*a* may be performed in different orders or at different times. For example, some operations may also be left out of process flow 800, or other operations may be added to process flow 800. Although UE 115-*e*, UE 115-*f*, and network entity 105-*a* are shown performing the operations of process flow 800, some aspects of some operations may also be performed by one or more other wireless devices. For example, some actions shown as being performed by network entity 105-*e* may be performed by another UE 115.

In some cases, at 805, UE 115-*e* and UE 115-*f* (e.g., among other UEs 115) may receive, from a network entity 105-*a*, control signaling indicating an RB set and a control RB grid. The control signaling may also indicate a configuration for the RB set. In some cases, UE 115-*e* and UE 115-*f* may receive the control signaling from another device, such as another UE 115.

At 810, the UE 115-*e* may identify the RB set and the control RB grid, the control RB grid indicating a set of common locations of a control channel (e.g., PSCCH) within the RB set. In some cases, the UE 115-*e* may identify the RB set and the control RB grid based on the control signaling received at 805. In some cases, the UE 115-*e* may identify the RB set and the control RB grid based on one or more preconfigured parameters at the UE 115-*e* (e.g., in accordance with a wireless communications standard). For example, as described with reference to FIGS. 3-5, UEs 115 may share a common RB grid for a PSCCH, such that the UEs 115 may transmit and receive SCI via the PSCCH.

At 815, the UE 115-*f* may identify the RB set and the control RB grid, the control RB grid indicating the set of common locations of the control channel within the RB set. In some cases, the UE 115-*f* may identify the RB set and the control RB grid based on the control signaling received at 805. In some cases, the UE 115-*f* may identify the RB set and the control RB grid based on one or more preconfigured parameters at the UE 115-*f* (e.g., in accordance with a wireless communications standard). For example, as described with reference to FIGS. 3-5, UEs 115 may share a common RB grid for a PSCCH, such that the UEs 115 may transmit and receive SCI via the PSCCH.

In some cases, at 820, the UE 115-*e* (e.g., or the UE 115-*f*) may select a data block grid offset for a sidelink shared data channel (e.g., PSSCH). In some cases, the data block grid offset may indicate a data block grid within the RB set.

At 825, the UE 115-*e* may transmit, to the UE 115-*f*, SCI via at least a subset of the set of common locations of the control channel within the control RB grid, the SCI indicating a data block grid offset for a PSSCH with respect to the control RB grid. For example, as described with reference to FIGS. 3-5, a transmitting UE 115 (e.g., UE 115-*e*) may transmit SCI within a shared or common RB grid for a PSCCH, where the SCI may indicate an RB grid offset for an associated PSSCH.

At 830, the UE 115-*e* may transmit, to the UE 115-*f*, sidelink data via the sidelink shared data channel based on the data block grid offset. For example, the UE 115-*e* may transmit data using an RB grid selected by UE 115-*e* for transmission of the PSSCH (e.g., as described with reference to FIGS. 3-5). In some cases, the UE 115-*e* may TDM the sidelink shared data channel (e.g., PSSCH) with the control channel. In such cases, a symbol associated with the sidelink shared data channel may follow one or more symbols associated with the control channel and the data block grid offset may apply to the sidelink shared data channel based on the symbol following the one or more symbols associated with the control channel.

In some cases, the UE 115-*e* may rate match the sidelink shared data channel in one or more sidelink shared data channel symbols other than one or more RBs of a subchannel associated with the sidelink shared data channel. In some cases, the UE 115-*e* may rate match the sidelink shared data channel in one or more sidelink shared data channel symbols other than one or more REs of a subchannel associated with the sidelink shared data channel, where the one or more REs correspond to the data block grid offset.

Figure 9:
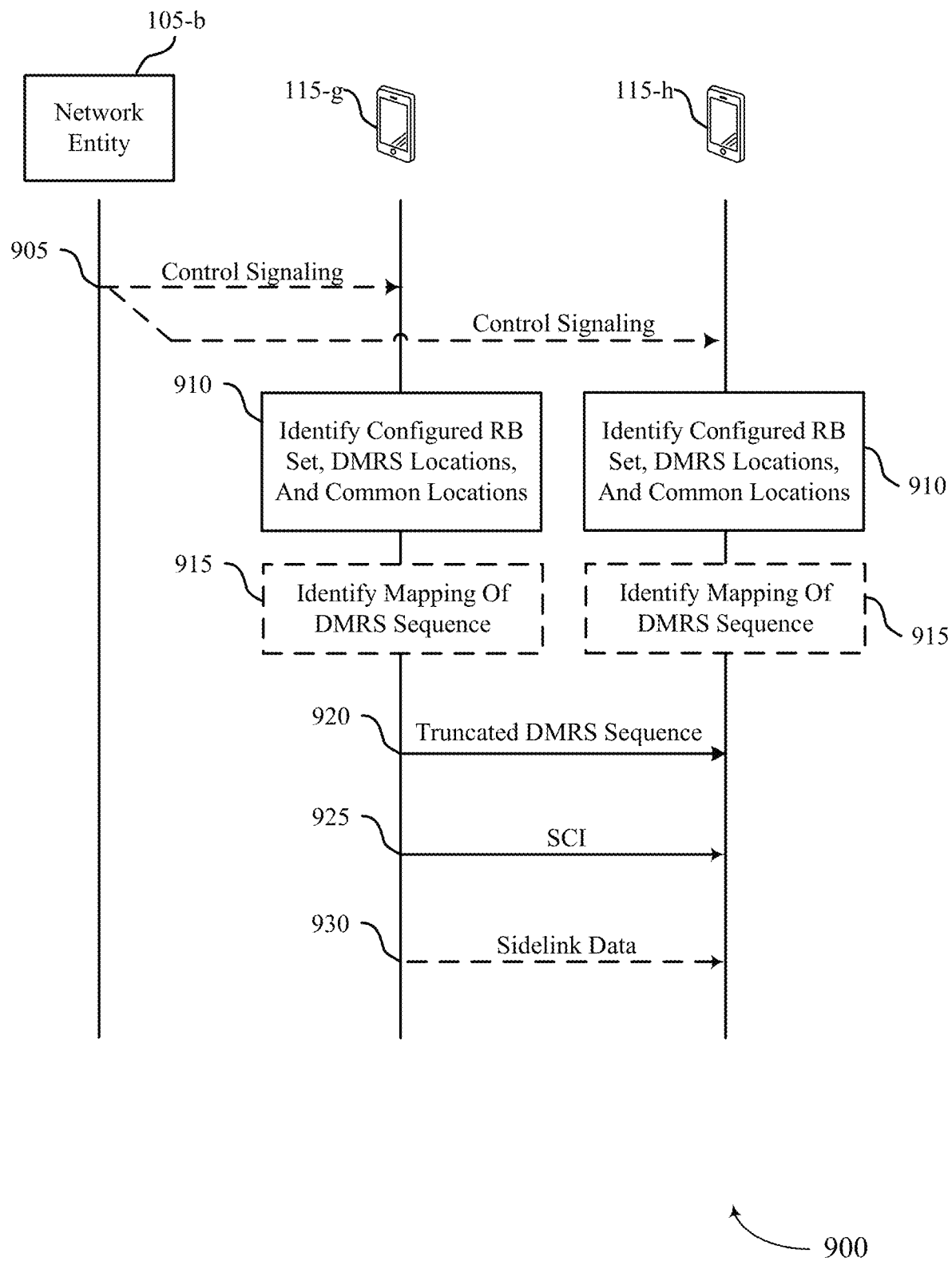

FIG. 9 illustrates an example of a process flow 900 that supports RB grid alignment at sidelink nodes in accordance with one or more aspects of the present disclosure. The process flow 900 may implement or be implemented by aspects of the wireless communications system 100, the RB configuration 200, the wireless communications system 300, the RB configuration 600, or the RB configuration 700. For example, process flow 900 may be implemented by a UE 115-*g*, a UE 115-*h*, and a network entity 105-*b*, which may be examples of UEs 115 and a network entity 105 described with reference to FIGS. 1-8.

In the following description of process flow 900, the operations may be performed in a different order than the order shown, or the operations performed by UE 115-*g*, UE 115-*h*, and network entity 105-*b* may be performed in different orders or at different times. For example, some operations may also be left out of process flow 900, or other operations may be added to process flow 900. Although UE 115-*g*, UE 115-*h*, and network entity 105-*b* are shown performing the operations of process flow 900, some aspects of some operations may also be performed by one or more other wireless devices. For example, some actions shown as being performed by network entity 105-*g* may be performed by another UE 115.

In some cases, at 905, UE 115-*g* and UE 115-*h* (e.g., among other UEs 115) may receive, from a network entity 105-*b*, control signaling indicating an RB set, a set of common DRMS locations, a set of common locations of a control channel (e.g., PSCCH), or any combination thereof. The control signaling may also indicate a configuration for the RB set. In some cases, UE 115-g and UE 115-h may receive the control signaling from another device, such as another UE 115.

At 910, the UE 115-g and the UE 115-h may identify the RB set, the set of common DMRS locations within the RB set, and the set of common locations of the control channel within the RB set. In some cases, the UEs 115 may identify the RB set, the set of common DMRS locations, and the set of common locations of the control channel based on the control signaling received at 905. In some cases, the UEs 115 may identify the RB set, the set of common DMRS locations, and the set of common locations of the control channel based on one or more preconfigured parameters at the UEs 115 (e.g., in accordance with a wireless communications standard). For example, as described with reference to FIGS. 3, 6, and 7, UEs 115 may share a common DMRS locations for a PSCCH, such that the UEs 115 may transmit and receive SCI via the PSCCH.

At 915, in some cases, the UE 115-g and the UE 115-h may identify a mapping of the truncated DMRS sequence that begins at a common frequency location of the RB set (e.g., as described with reference to FIG. 6). In some cases, the common frequency location may be a common frequency location of the RB set associated with a first RB offset. In some cases, the mapping may correspond to an RE offset that is based on an RB grid associated with the control channel. In some cases, a scrambling ID associated with the truncated DMRS may be independent of an RB grid associated with the control channel. In some cases, the UE 115-g may identify mapping of the truncated DMRS sequence that begins at a common frequency location of the RB grid.

At 920, as described with reference to FIGS. 3, 6, and 7, the UE 115-g may transmit, to the UE 115-h, a truncated DMRS sequence via at least a subset of the set of common DMRS locations within the RB set. In some cases, transmitting the truncated DMRS sequence may be based on the identified mapping. In some cases, the UE 115-g may transmit the truncated DMRS sequence in one or more allocated common RBs of the RB set based on a sidelink resource pool configuration, where the truncated DMRS sequence corresponds to the identified mapping.

At 925, the UE 115-g may transmit, to the UE 115-h, SCI via at least a subset of the set of common locations of the control channel corresponding to the subset of the set of common DMRS locations. In some cases, the SCI may indicate a data block grid offset for a sidelink shared data channel (e.g., PSSCH) with respect to a common RB grid. In some cases, the UE 115-g may transmit the SCI via a signal having a continuous waveform or an interlaced waveform.

In some cases, at 930, the UE 115-g may transmit, to the UE 115-h, sidelink data via the sidelink shared data channel based at least in part on the data block grid offset, where the data block grid offset indicates a data block grid within the RB set.

Figure 10:
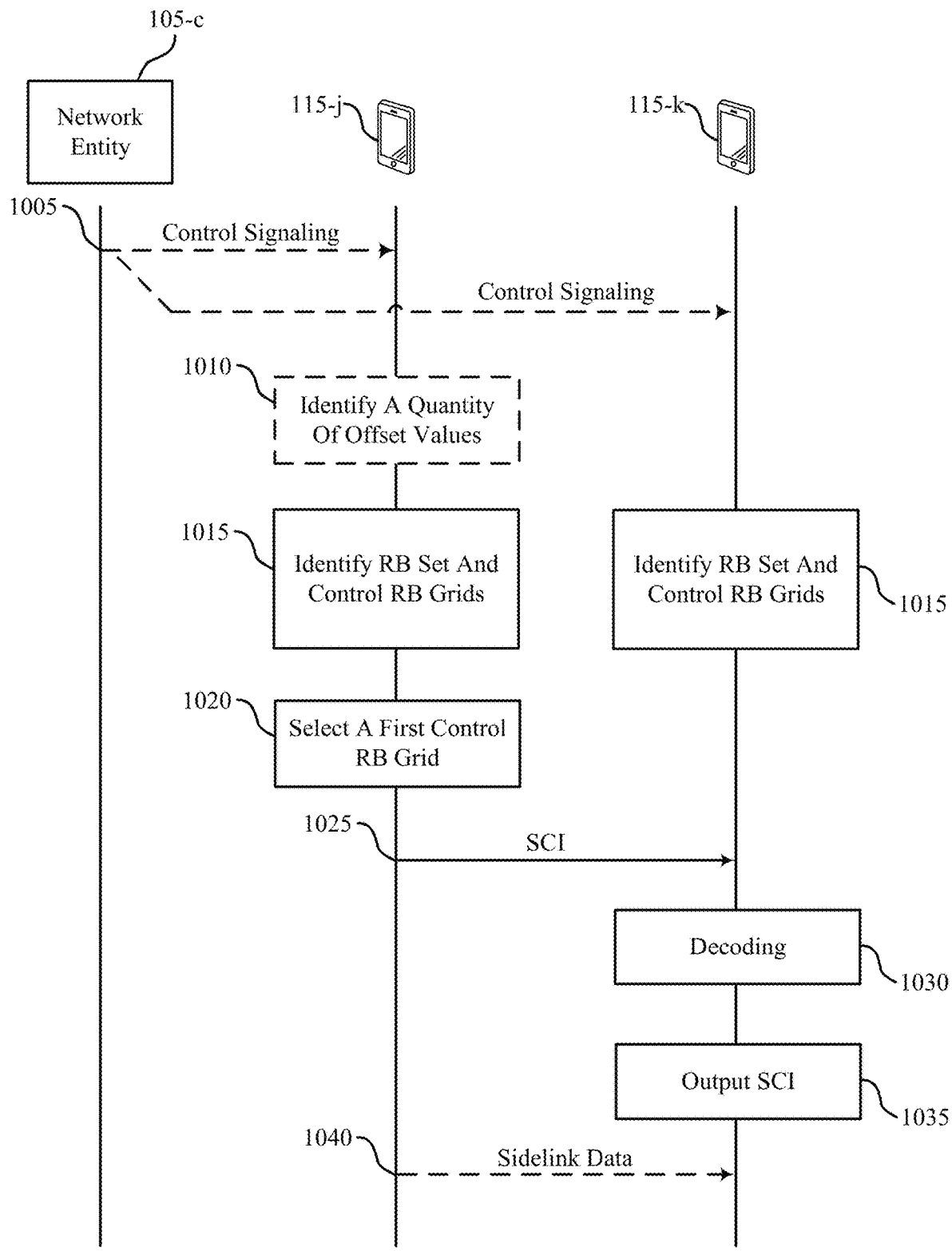

FIG. 10 illustrates an example of a process flow 1000 that supports RB grid alignment at sidelink nodes in accordance with one or more aspects of the present disclosure. The process flow 1000 may implement or be implemented by aspects of the wireless communications system 100, the RB configuration 200, or the wireless communications system 300. For example, process flow 1000 may be implemented by a UE 115-j, a UE 115-k, and a network entity 105-c, which may be examples of UEs 115 and a network entity 105 described with reference to FIGS. 1-9.

In the following description of process flow 1000, the operations may be performed in a different order than the order shown, or the operations performed by UE 115-j, UE 115-k, and network entity 105-c may be performed in different orders or at different times. For example, some operations may also be left out of process flow 1000, or other operations may be added to process flow 1000. Although UE 115-j, UE 115-k, and network entity 105-c are shown performing the operations of process flow 1000, some aspects of some operations may also be performed by one or more other wireless devices. For example, some actions shown as being performed by network entity 105-j may be performed by another UE 115.

In some cases, at 1005, a UE 115-j and a UE 115-k may receive, from a network entity 105-c, control signaling indicating an RB set and a control RB grid. The control signaling may also indicate a configuration for the RB set. In some cases, UE 115-j and UE 115-k may receive the control signaling from another device, such as another UE 115.

In some cases, at 1010, the UE 115-j and the UE 115-k may identify a quantity of offset values associated with a set of control RB grids. In some cases, the quantity of offset values may be indicated in the control signaling. In some cases, the quantity of offset values may be preconfigured at the UEs 115 (e.g., in accordance with a wireless communications standard).

At 1015, the UE 115-j and the UE 115-k may identify an RB set and a set of control RB grids, where each control RB grid may be offset in frequency relative a respective RB grid of the set of control RB grids. In some cases, the UEs 115 may identify the RB set and the set of control RB grids based on the control signaling received at 1005. In some cases, the UEs 115 may identify the RB set and the set of control RB grids based on one or more preconfigured parameters at the UEs 115 (e.g., in accordance with a wireless communications standard).

At 1020, the UE 115-j may select a first control RB grid from the set of control RB grids for transmitting SCI (e.g., via a sidelink control channel, such as a PSCCH). The first control RB grid may indicate a set of locations for a control channel (e.g., PSCCH). In some cases, the first control RB grid may also indicate a set of locations for the sidelink shared data channel (e.g., PSSCH).

At 1025, the UE 115-j may transmit, to the UE 115-k, the SCI via at least a subset of the set of control locations for the control channel (e.g., PSCCH) of the first control RB grid.

At 1030, the UE 115-k may perform decoding of multiple decoding hypotheses corresponding to the set of control RB grids. For example, as described with reference to FIG. 3, the UE 115-k may perform decoding hypotheses corresponding to each control RB grid of the set of control RB grids.

At 1035, the UE 115-k may output SCI decoded via at least a subset of the set of locations of the control channel corresponding to the first control RB grid based on performing the decoding of the multiple decoding hypotheses. For example, as described with reference to FIG. 3, the UE 115-k may output decoded SCI corresponding to a most successful hypothesis, where the most successful hypothesis may correspond to the first control RB grid.

In some cases, at 1040, the UE 115-j may transmit, to the UE 115-k, the sidelink data via at least a subset of the set of locations for the sidelink shared data channel of the first control RB grid. UE 115-k may select the first control RB grid for decoding the sidelink data via the sidelink shared data channel (e.g., based on outputting the SCI corresponding to the first control RB grid), and may output the based on performing decoding on at least a subset of the plurality of locations for the sidelink shared data channel.

Figure 11:
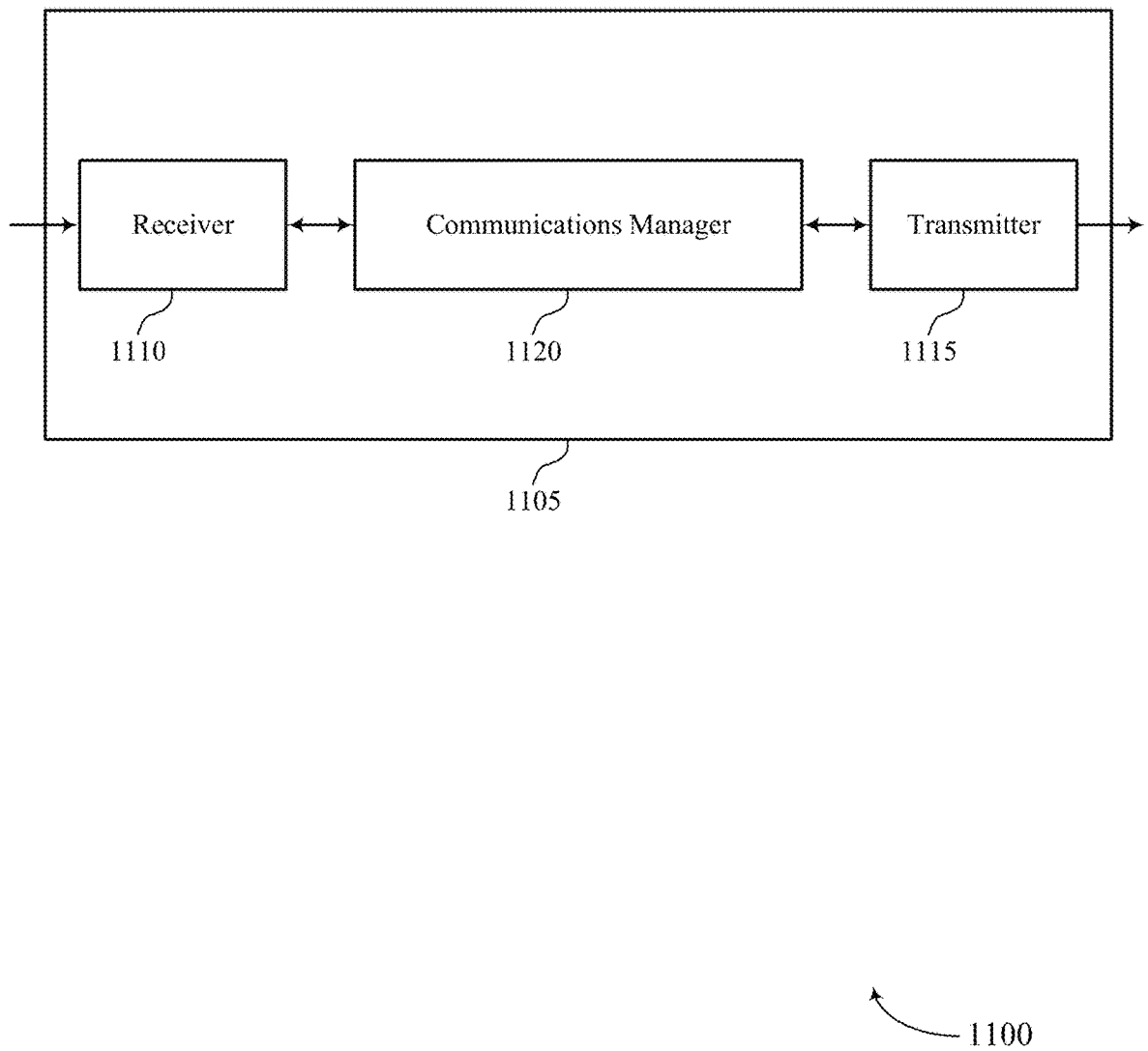
FIGS. 11 and 12 show block diagrams of devices that support RB grid alignment at sidelink nodes in accordance with one or more aspects of the present disclosure.

FIG. 11 shows a block diagram 1100 of a device 1105 that supports RB grid alignment at sidelink nodes in accordance with one or more aspects of the present disclosure. The device 1105 may be an example of aspects of a UE 115 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the RB grid alignment features discussed herein. Each of these components may be in communication with one another (e.g., via one or more buses).

The receiver 1110 may provide a means for receiving information such as packets, user data, control information, or any combination thereof associated with various information channels (e.g., control channels, data channels, information channels related to RB grid alignment at sidelink nodes). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to RB grid alignment at sidelink nodes). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of RB grid alignment at sidelink nodes as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a wireless device in accordance with examples as disclosed herein. For example, the communications manager 1120 may be configured as or otherwise support a means for identifying an RB set and a control RB grid, the control RB grid indicating a set of multiple common locations of a control channel within the RB set. The communications manager 1120 may be configured as or otherwise support a means for transmitting SCI via at least a subset of the set of multiple common locations of the control channel within the control RB grid, the SCI indicating a data block grid offset for a sidelink shared data channel with respect to the control RB grid. The communications manager 1120 may be configured as or otherwise support a means for transmitting sidelink data via the sidelink shared data channel based on the data block grid offset.

Additionally, or alternatively, the communications manager 1120 may support wireless communication at a wireless device in accordance with examples as disclosed herein. For example, the communications manager 1120 may be configured as or otherwise support a means for identifying an RB set and a control RB grid, the control RB grid indicating a set of multiple common locations of a control channel within the RB set. The communications manager 1120 may be configured as or otherwise support a means for receiving SCI via at least a subset of the set of multiple common locations of the control channel within the control RB grid, the SCI indicating a data block grid offset for a sidelink shared data channel with respect to the control RB grid. The communications manager 1120 may be configured as or otherwise support a means for receiving sidelink data via the sidelink shared data channel based on the data block grid offset.

Additionally, or alternatively, the communications manager 1120 may support wireless communication at a wireless device in accordance with examples as disclosed herein. For example, the communications manager 1120 may be configured as or otherwise support a means for identifying an RB set, a set of multiple common DMRS locations within the RB set, and a set of multiple common locations of a control channel within the RB set. The communications manager 1120 may be configured as or otherwise support a means for transmitting a truncated DMRS sequence via at least a subset of the set of multiple common DMRS locations within the RB set. The communications manager 1120 may be configured as or otherwise support a means for transmitting SCI via at least a subset of the set of multiple common locations of the control channel corresponding to the subset of the set of multiple common DMRS locations.

Additionally, or alternatively, the communications manager 1120 may support wireless communication at a wireless device in accordance with examples as disclosed herein. For example, the communications manager 1120 may be configured as or otherwise support a means for identifying an RB set, a set of multiple common DMRS locations within the RB set, and a set of multiple common locations of a control channel within the RB set. The communications manager 1120 may be configured as or otherwise support a means for receiving a truncated DMRS sequence via at least a subset of the set of multiple common DMRS locations within the RB set. The communications manager 1120 may be configured as or otherwise support a means for receiving SCI via at least a subset of the set of multiple common locations of the control channel corresponding to the subset of the set of multiple common DMRS locations.

Additionally, or alternatively, the communications manager 1120 may support wireless communication at a wireless device in accordance with examples as disclosed herein. For example, the communications manager 1120 may be configured as or otherwise support a means for identifying an RB set and a set of multiple control RB grids within the RB set, where each control RB grid is offset in frequency relative a respective RB grid of the set of multiple control RB grids. The communications manager 1120 may be configured as or otherwise support a means for selecting a first control RB grid from the set of multiple control RB grids for transmitting SCI, the first control RB grid indicating a set of multiple locations for a control channel. The communications manager 1120 may be configured as or otherwise support a means for transmitting the SCI via at least a subset of the set of multiple locations for the control channel of the first control RB grid.

Additionally, or alternatively, the communications manager 1120 may support wireless communication at a wireless device in accordance with examples as disclosed herein. For example, the communications manager 1120 may be configured as or otherwise support a means for identifying an RB set and a set of multiple control RB grids within the RB set, where each control RB grid is offset in frequency relative a respective RB grid of the set of multiple control RB grids. The communications manager 1120 may be configured as or otherwise support a means for performing decoding of a set of multiple decoding hypotheses corresponding to the set of multiple control RB grids. The communications manager 1120 may be configured as or otherwise support a means for outputting SCI decoded via at least a subset of a set of multiple locations of a control channel corresponding to a first control RB grid of the set of multiple control RB grids based on performing the decoding of the set of multiple decoding hypotheses.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for RB grid alignment which may result in reduced processing, reduced power consumption, and more efficient utilization of communication resources), among other advantages.

Figure 12:
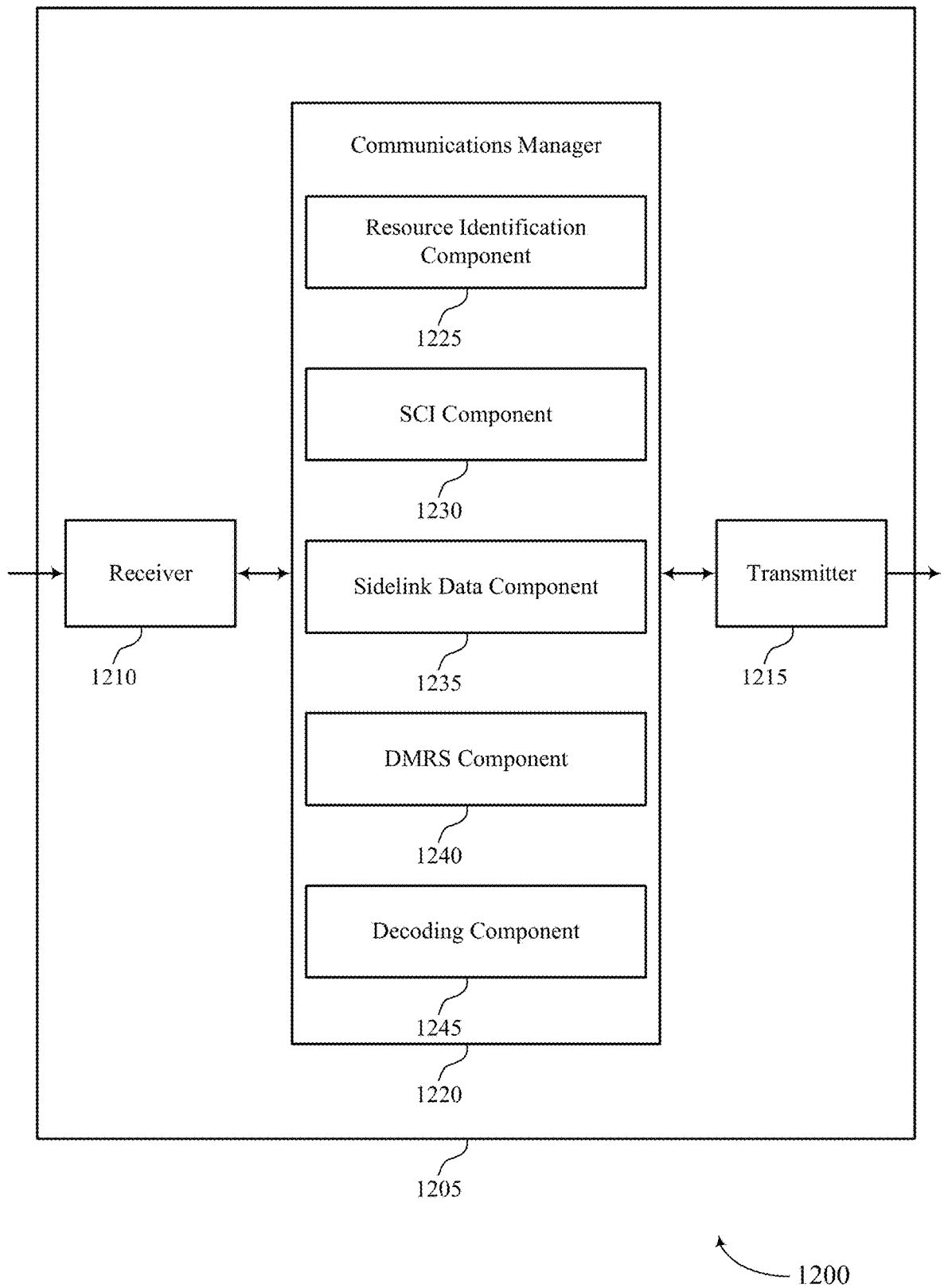

FIG. 12 shows a block diagram 1200 of a device 1205 that supports RB grid alignment at sidelink nodes in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to RB grid alignment at sidelink nodes). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to RB grid alignment at sidelink nodes). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of RB grid alignment at sidelink nodes as described herein. For example, the communications manager 1220 may include a resource identification component 1225, a SCI component 1230, a sidelink data component 1235, a DMRS component 1240, a decoding component 1245, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a wireless device in accordance with examples as disclosed herein. The resource identification component 1225 may be configured as or otherwise support a means for identifying an RB set and a control RB grid, the control RB grid indicating a set of multiple common locations of a control channel within the RB set. The SCI component 1230 may be configured as or otherwise support a means for transmitting SCI via at least a subset of the set of multiple common locations of the control channel within the control RB grid, the SCI indicating a data block grid offset for a sidelink shared data channel with respect to the control RB grid. The sidelink data component 1235 may be configured as or otherwise support a means for transmitting sidelink data via the sidelink shared data channel based on the data block grid offset.

Additionally, or alternatively, the communications manager 1220 may support wireless communication at a wireless device in accordance with examples as disclosed herein. The resource identification component 1225 may be configured as or otherwise support a means for identifying an RB set and a control RB grid, the control RB grid indicating a set of multiple common locations of a control channel within the RB set. The SCI component 1230 may be configured as or otherwise support a means for receiving SCI via at least a subset of the set of multiple common locations of the control channel within the control RB grid, the SCI indicating a data block grid offset for a sidelink shared data channel with respect to the control RB grid. The sidelink data component 1235 may be configured as or otherwise support a means for receiving sidelink data via the sidelink shared data channel based on the data block grid offset.

Additionally, or alternatively, the communications manager 1220 may support wireless communication at a wireless device in accordance with examples as disclosed herein. The resource identification component 1225 may be configured as or otherwise support a means for identifying an RB set, a set of multiple common DMRS locations within the RB set, and a set of multiple common locations of a control channel within the RB set. The DMRS component 1240 may be configured as or otherwise support a means for transmitting a truncated DMRS sequence via at least a subset of the set of multiple common DMRS locations within the RB set. The SCI component 1230 may be configured as or otherwise support a means for transmitting SCI via at least a subset of the set of multiple common locations of the control channel corresponding to the subset of the set of multiple common DMRS locations.

Additionally, or alternatively, the communications manager 1220 may support wireless communication at a wireless device in accordance with examples as disclosed herein. The resource identification component 1225 may be configured as or otherwise support a means for identifying an RB set, a set of multiple common DMRS locations within the RB set, and a set of multiple common locations of a control channel within the RB set. The DMRS component 1240 may be configured as or otherwise support a means for receiving a truncated DMRS sequence via at least a subset of the set of multiple common DMRS locations within the RB set. The SCI component 1230 may be configured as or otherwise support a means for receiving SCI via at least a subset of the set of multiple common locations of the control channel corresponding to the subset of the set of multiple common DMRS locations.

Additionally, or alternatively, the communications manager 1220 may support wireless communication at a wireless device in accordance with examples as disclosed herein. The resource identification component 1225 may be configured as or otherwise support a means for identifying an RB set and a set of multiple control RB grids within the RB set, where each control RB grid is offset in frequency relative a respective RB grid of the set of multiple control RB grids. The resource identification component 1225 may be configured as or otherwise support a means for selecting a first control RB grid from the set of multiple control RB grids for transmitting SCI, the first control RB grid indicating a set of multiple locations for a control channel. The SCI component 1230 may be configured as or otherwise support a means for transmitting the SCI via at least a subset of the set of multiple locations for the control channel of the first control RB grid.

Additionally, or alternatively, the communications manager 1220 may support wireless communication at a wireless device in accordance with examples as disclosed herein. The resource identification component 1225 may be configured as or otherwise support a means for identifying an RB set and a set of multiple control RB grids within the RB set, where each control RB grid is offset in frequency relative a respective RB grid of the set of multiple control RB grids. The decoding component 1245 may be configured as or otherwise support a means for performing decoding of a set of multiple decoding hypotheses corresponding to the set of multiple control RB grids. The SCI component 1230 may be configured as or otherwise support a means for outputting SCI decoded via at least a subset of a set of multiple locations of a control channel corresponding to a first control RB grid of the set of multiple control RB grids based on performing the decoding of the set of multiple decoding hypotheses.

In some cases, the resource identification component 1225, the SCI component 1230, the sidelink data component 1235, the DMRS component 1240, and the decoding component 1245 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the resource identification component 1225, the SCI component 1230, the sidelink data component 1235, the DMRS component 1240, and the decoding component 1245 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 13:
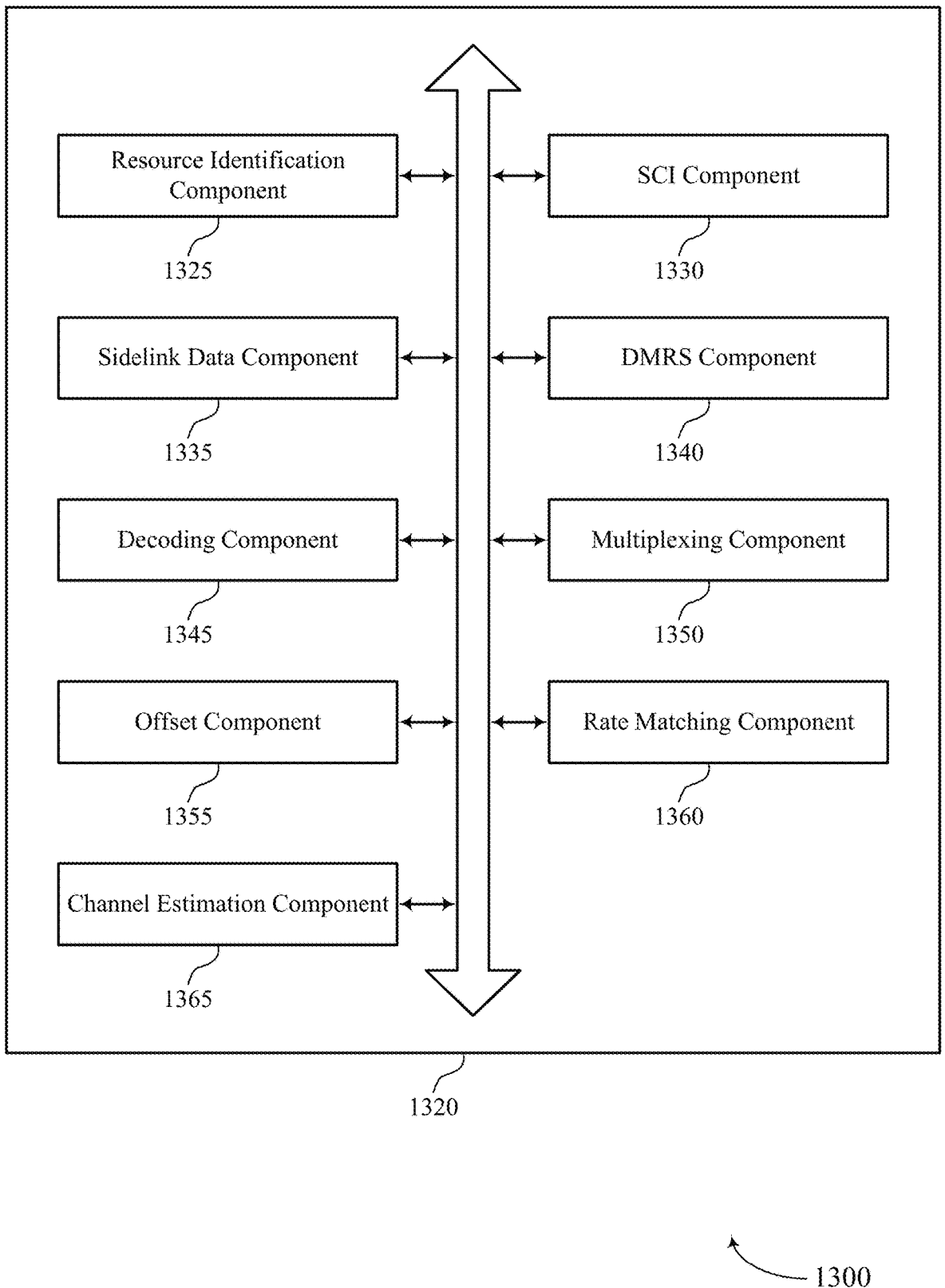
FIG. 13 shows a block diagram of a communications manager that supports RB grid alignment at sidelink nodes in accordance with one or more aspects of the present disclosure.

FIG. 13 shows a block diagram 1300 of a communications manager 1320 that supports RB grid alignment at sidelink nodes in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of RB grid alignment at sidelink nodes as described herein. For example, the communications manager 1320 may include a resource identification component 1325, a SCI component 1330, a sidelink data component 1335, a DMRS component 1340, a decoding component 1345, a multiplexing component 1350, an offset component 1355, a rate matching component 1360, a channel estimation component 1365, or any combination thereof. Each of these components may communicate, directly or indirectly, with one another (e.g., via one or more buses).

The communications manager 1320 may support wireless communication at a wireless device in accordance with examples as disclosed herein. The resource identification component 1325 may be configured as or otherwise support a means for identifying an RB set and a control RB grid, the control RB grid indicating a set of multiple common locations of a control channel within the RB set. The SCI component 1330 may be configured as or otherwise support a means for transmitting SCI via at least a subset of the set of multiple common locations of the control channel within the control RB grid, the SCI indicating a data block grid offset for a sidelink shared data channel with respect to the control RB grid. The sidelink data component 1335 may be configured as or otherwise support a means for transmitting sidelink data via the sidelink shared data channel based on the data block grid offset.

In some examples, to support identifying the RB set and the control RB grid, the resource identification component 1325 may be configured as or otherwise support a means for receiving control signaling indicating the RB set and the control RB grid, the control signaling indicating a configuration for the RB set.

In some examples, to support transmitting the sidelink data via the sidelink shared data channel, the multiplexing component 1350 may be configured as or otherwise support a means for TDMing the sidelink shared data channel with the control channel, where a symbol associated with the sidelink shared data channel follows one or more symbols associated with the control channel, and where the data block grid offset applies to the sidelink shared data channel based on the symbol following the one or more symbols associated with the control channel.

In some examples, the offset component 1355 may be configured as or otherwise support a means for selecting the data block grid offset for the sidelink shared data channel, where transmitting the sidelink data via the sidelink shared data channel is based on selecting the data block grid offset.

In some examples, to support transmitting the sidelink data via the sidelink shared data channel, the rate matching component 1360 may be configured as or otherwise support a means for rate matching the sidelink shared data channel in one or more sidelink shared data channel symbols other than one or more RBs of a subchannel associated with the sidelink shared data channel.

In some examples, to support transmitting the sidelink data via the sidelink shared data channel, the rate matching component 1360 may be configured as or otherwise support a means for rate matching the sidelink shared data channel in one or more sidelink shared data channel symbols other than one or more REs of a subchannel associated with the sidelink shared data channel, where the one or more REs correspond to the data block grid offset.

In some examples, to support transmitting the sidelink data via the sidelink shared data channel, the rate matching component 1360 may be configured as or otherwise support a means for rate matching the sidelink shared data channel in one or more sidelink shared data channel symbols other than one or more frequency resources associated with the set of multiple common locations of the control channel within the control RB grid.

In some examples, the data block grid offset indicates a data block grid within the RB set.

Additionally, or alternatively, the communications manager 1320 may support wireless communication at a wireless device in accordance with examples as disclosed herein. In some examples, the resource identification component 1325 may be configured as or otherwise support a means for identifying an RB set and a control RB grid, the control RB grid indicating a set of multiple common locations of a control channel within the RB set. In some examples, the SCI component 1330 may be configured as or otherwise support a means for receiving SCI via at least a subset of the set of multiple common locations of the control channel within the control RB grid, the SCI indicating a data block grid offset for a sidelink shared data channel with respect to the control RB grid. In some examples, the sidelink data component 1335 may be configured as or otherwise support a means for receiving sidelink data via the sidelink shared data channel based on the data block grid offset.

In some examples, to support identifying the RB set and the control RB grid, the resource identification component 1325 may be configured as or otherwise support a means for receiving control signaling indicating the RB set and the control RB grid, the control signaling indicating a configuration for the RB set.

In some examples, to support receiving the sidelink data via the sidelink shared data channel, the multiplexing component 1350 may be configured as or otherwise support a means for TDMing the sidelink shared data channel with the control channel, where a symbol associated with the sidelink shared data channel follows one or more symbols associated with the control channel, and where the data block grid offset applies to the sidelink shared data channel based on the symbol following the one or more symbols associated with the control channel.

In some examples, to support receiving the sidelink data via the sidelink shared data channel, the rate matching component 1360 may be configured as or otherwise support a means for rate matching the sidelink shared data channel in one or more sidelink shared data channel symbols other than one or more RBs of a subchannel associated with the sidelink shared data channel.

In some examples, to support receiving the sidelink data via the sidelink shared data channel, the rate matching component 1360 may be configured as or otherwise support a means for rate matching the sidelink shared data channel in one or more sidelink shared data channel symbols other than one or more REs of a subchannel associated with the sidelink shared data channel, where the one or more REs correspond to the data block grid offset.

In some examples, to support receiving the sidelink data via the sidelink shared data channel, the rate matching component 1360 may be configured as or otherwise support a means for rate matching the sidelink shared data channel in one or more sidelink shared data channel symbols other than one or more frequency resources associated with the set of multiple common locations of the control channel within the control RB grid.

In some examples, the data block grid offset indicates a data block grid within the RB set.

Additionally, or alternatively, the communications manager 1320 may support wireless communication at a wireless device in accordance with examples as disclosed herein. In some examples, the resource identification component 1325 may be configured as or otherwise support a means for identifying an RB set, a set of multiple common DMRS locations within the RB set, and a set of multiple common locations of a control channel within the RB set. The DMRS component 1340 may be configured as or otherwise support a means for transmitting a truncated DMRS sequence via at least a subset of the set of multiple common DMRS locations within the RB set. In some examples, the SCI component 1330 may be configured as or otherwise support a means for transmitting SCI via at least a subset of the set of multiple common locations of the control channel corresponding to the subset of the set of multiple common DMRS locations.

In some examples, to support identifying the RB set, the set of multiple common DMRS locations, and the set of multiple common locations of the control channel, the resource identification component 1325 may be configured as or otherwise support a means for receiving control signaling indicating the RB set, the set of multiple common DMRS locations, the set of multiple common locations of the control channel, or any combination thereof, the control signaling indicating a configuration for the RB set.

In some examples, the DMRS component 1340 may be configured as or otherwise support a means for identifying a mapping of the truncated DMRS sequence that begins at a common frequency location of the RB set, where transmitting the truncated DMRS sequence is based on the mapping.

In some examples, to support transmitting the truncated DMRS sequence, the DMRS component 1340 may be configured as or otherwise support a means for transmitting the truncated DMRS sequence in one or more allocated common RBs of the RB set based on a sidelink resource pool configuration, where the truncated DMRS sequence corresponds to the mapping.

In some examples, the DMRS component 1340 may be configured as or otherwise support a means for identifying a mapping of the truncated DMRS sequence that begins at a common frequency location of the RB set associated with a first RB offset, where transmitting the truncated DMRS sequence is based on the mapping.

In some examples, the mapping corresponds to a RE offset that is based on an RB grid associated with the control channel.

In some examples, a scrambling ID associated with the truncated DMRS sequence is independent of an RB grid associated with the control channel.

In some examples, the DMRS component 1340 may be configured as or otherwise support a means for identifying a mapping of the truncated DMRS sequence that begins at a frequency location of a common RB grid, where transmitting the truncated DMRS sequence is based on the mapping.

In some examples, to support transmitting the SCI, the SCI component 1330 may be configured as or otherwise support a means for transmitting the SCI indicating a data block grid offset for a sidelink shared data channel with respect to a common RB grid.

In some examples, the sidelink data component 1335 may be configured as or otherwise support a means for transmitting sidelink data via the sidelink shared data channel based on the data block grid offset, where the data block grid offset indicates a data block grid within the RB set.

In some examples, the SCI is transmitted via a signal having a continuous waveform or an interlaced waveform.

Additionally, or alternatively, the communications manager 1320 may support wireless communication at a wireless device in accordance with examples as disclosed herein. In some examples, the resource identification component 1325 may be configured as or otherwise support a means for identifying an RB set, a set of multiple common DMRS locations within the RB set, and a set of multiple common locations of a control channel within the RB set. In some examples, the DMRS component 1340 may be configured as or otherwise support a means for receiving a truncated DMRS sequence via at least a subset of the set of multiple common DMRS locations within the RB set. In some examples, the SCI component 1330 may be configured as or otherwise support a means for receiving SCI via at least a subset of the set of multiple common locations of the control channel corresponding to the subset of the set of multiple common DMRS locations.

In some examples, to support identifying the RB set, the set of multiple common DMRS locations, and the set of multiple common locations of the control channel, the resource identification component 1325 may be configured as or otherwise support a means for receiving control signaling indicating the RB set, the set of multiple common DMRS locations, the set of multiple common locations of the control channel, or any combination thereof, the control signaling indicating a configuration for the RB set.

In some examples, the DMRS component 1340 may be configured as or otherwise support a means for identifying a mapping of the truncated DMRS sequence that begins at a common frequency location of the RB set, where receiving the truncated DMRS sequence is based on the mapping.

In some examples, to support receiving the truncated DMRS sequence, the DMRS component 1340 may be configured as or otherwise support a means for receiving the truncated DMRS sequence in one or more allocated common RBs of the RB set based on a sidelink resource pool configuration, where the truncated DMRS sequence corresponds to the mapping.

In some examples, the DMRS component 1340 may be configured as or otherwise support a means for identifying a mapping of the truncated DMRS sequence that begins at a common frequency location of the RB set associated with a first RB offset, where receiving the truncated DMRS sequence is based on the mapping.

In some examples, the mapping corresponds to a RE offset that is based on an RB grid associated with the control channel.

In some examples, a scrambling ID associated with the truncated DMRS sequence is independent of an RB grid associated with the control channel.

In some examples, the DMRS component 1340 may be configured as or otherwise support a means for identifying a mapping of the truncated DMRS sequence that begins at a frequency location of a common RB grid, where receiving the truncated DMRS sequence is based on the mapping.

In some examples, to support receiving the SCI, the SCI component 1330 may be configured as or otherwise support a means for receiving the SCI indicating a data block grid offset for a sidelink shared data channel with respect to a common RB grid.

In some examples, the sidelink data component 1335 may be configured as or otherwise support a means for receiving sidelink data via the sidelink shared data channel based on the data block grid offset, where the data block grid offset indicates a data block grid within the RB set.

In some examples, to support receiving the SCI, the decoding component 1345 may be configured as or otherwise support a means for performing decoding of a set of multiple decoding hypotheses corresponding to a set of multiple control RB grids within the RB set.

In some examples, the channel estimation component 1365 may be configured as or otherwise support a means for performing a channel estimation of the control channel using one or more first DMRS tones other than one or more second DMRS tones at an edge of the control channel.

In some examples, the SCI is received via a signal having a continuous waveform or an interlaced waveform.

Additionally, or alternatively, the communications manager 1320 may support wireless communication at a wireless device in accordance with examples as disclosed herein. In some examples, the resource identification component 1325 may be configured as or otherwise support a means for identifying an RB set and a set of multiple control RB grids within the RB set, where each control RB grid is offset in frequency relative a respective RB grid of the set of multiple control RB grids. In some examples, the resource identification component 1325 may be configured as or otherwise support a means for selecting a first control RB grid from the set of multiple control RB grids for transmitting SCI, the first control RB grid indicating a set of multiple locations for a control channel. In some examples, the SCI component 1330 may be configured as or otherwise support a means for transmitting the SCI via at least a subset of the set of multiple locations for the control channel of the first control RB grid.

In some examples, to support identifying the RB set and the set of multiple control RB grids, the resource identification component 1325 may be configured as or otherwise support a means for receiving control signaling indicating the RB set and the set of multiple control RB grids, the control signaling indicating a configuration for the RB set.

In some examples, the resource identification component 1325 may be configured as or otherwise support a means for selecting the first control RB grid for transmitting sidelink data via a sidelink shared data channel, the first control RB grid indicating a set of multiple locations for the sidelink shared data channel. In some examples, the sidelink data component 1335 may be configured as or otherwise support a means for transmitting the sidelink data via at least a subset of the set of multiple locations for the sidelink shared data channel of the first control RB grid.

In some examples, the offset component 1355 may be configured as or otherwise support a means for identifying a quantity of offset values associated with the set of multiple control RB grids, where identifying the set of multiple control RB grids is based on identifying the quantity of offset values.

In some examples, to support identifying the quantity of offset values, the offset component 1355 may be configured as or otherwise support a means for receiving control signaling indicating the quantity of offset values.

Additionally, or alternatively, the communications manager 1320 may support wireless communication at a wireless device in accordance with examples as disclosed herein. In some examples, the resource identification component 1325 may be configured as or otherwise support a means for identifying an RB set and a set of multiple control RB grids within the RB set, where each control RB grid is offset in frequency relative a respective RB grid of the set of multiple control RB grids. The decoding component 1345 may be configured as or otherwise support a means for performing decoding of a set of multiple decoding hypotheses corresponding to the set of multiple control RB grids. In some examples, the SCI component 1330 may be configured as or otherwise support a means for outputting SCI decoded via at least a subset of a set of multiple locations of a control channel corresponding to a first control RB grid of the set of multiple control RB grids based on performing the decoding of the set of multiple decoding hypotheses.

In some examples, to support identifying the RB set and the set of multiple control RB grids, the resource identification component 1325 may be configured as or otherwise support a means for receiving control signaling indicating the RB set and the set of multiple control RB grids, the control signaling indicating a configuration for the RB set.

In some examples, the resource identification component 1325 may be configured as or otherwise support a means for selecting the first control RB grid for decoding sidelink data via a sidelink shared data channel, the first control RB grid indicating a set of multiple locations for the sidelink shared data channel. In some examples, the sidelink data component 1335 may be configured as or otherwise support a means for outputting the sidelink data based on performing decoding on at least a subset of the set of multiple locations for the sidelink shared data channel.

In some examples, the offset component 1355 may be configured as or otherwise support a means for identifying a quantity of offset values associated with the set of multiple control RB grids, where identifying the set of multiple control RB grids is based on identifying the quantity of offset values.

In some examples, to support identifying the quantity of offset values, the offset component 1355 may be configured as or otherwise support a means for receiving control signaling indicating the quantity of offset values.

In some cases, the resource identification component 1325, the SCI component 1330, the sidelink data component 1335, the DMRS component 1340, the decoding component 1345, the multiplexing component 1350, the offset component 1355. the rate matching component 1360, and the channel estimation component 1365 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the resource identification component 1325, the SCI component 1330, the sidelink data component 1335, the DMRS component 1340, the decoding component 1345, the multiplexing component 1350, the offset component 1355. the rate matching component 1360, and the channel estimation component 1365 discussed herein.

Figure 14:
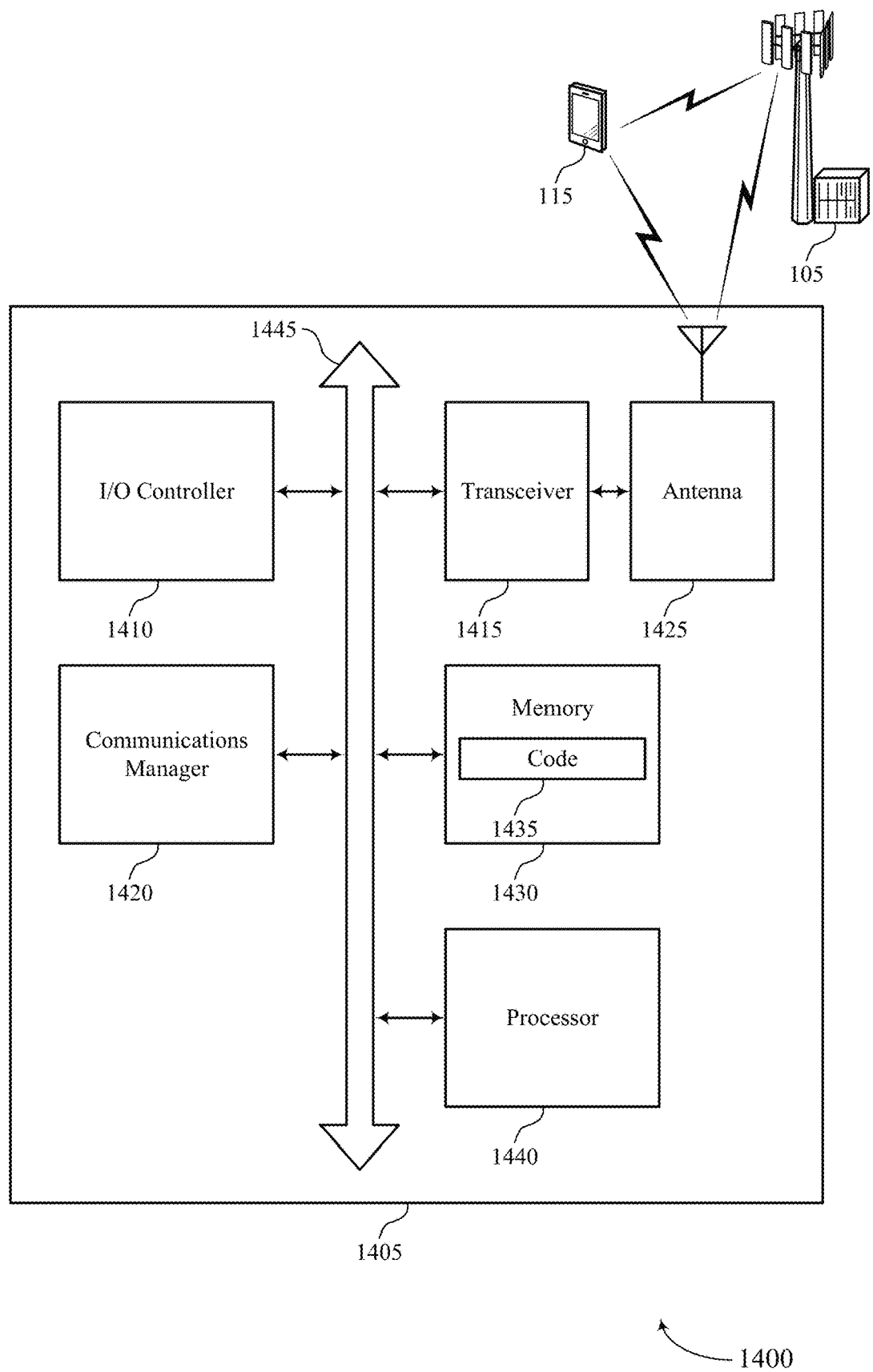
FIG. 14 shows a diagram of a system including a device that supports RB grid alignment at sidelink nodes in accordance with one or more aspects of the present disclosure.

FIG. 14 shows a diagram of a system 1400 including a device 1405 that supports RB grid alignment at sidelink nodes in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425.

The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting RB grid alignment at sidelink nodes). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communication at a wireless device in accordance with examples as disclosed herein. For example, the communications manager 1420 may be configured as or otherwise support a means for identifying an RB set and a control RB grid, the control RB grid indicating a set of multiple common locations of a control channel within the RB set. The communications manager 1420 may be configured as or otherwise support a means for transmitting SCI via at least a subset of the set of multiple common locations of the control channel within the control RB grid, the SCI indicating a data block grid offset for a sidelink shared data channel with respect to the control RB grid. The communications manager 1420 may be configured as or otherwise support a means for transmitting sidelink data via the sidelink shared data channel based on the data block grid offset.

Additionally, or alternatively, the communications manager 1420 may support wireless communication at a wireless device in accordance with examples as disclosed herein. For example, the communications manager 1420 may be configured as or otherwise support a means for identifying an RB set and a control RB grid, the control RB grid indicating a set of multiple common locations of a control channel within the RB set. The communications manager 1420 may be configured as or otherwise support a means for receiving SCI via at least a subset of the set of multiple common locations of the control channel within the control RB grid, the SCI indicating a data block grid offset for a sidelink shared data channel with respect to the control RB grid. The communications manager 1420 may be configured as or otherwise support a means for receiving sidelink data via the sidelink shared data channel based on the data block grid offset.

Additionally, or alternatively, the communications manager 1420 may support wireless communication at a wireless device in accordance with examples as disclosed herein. For example, the communications manager 1420 may be configured as or otherwise support a means for identifying an RB set, a set of multiple common DMRS locations within the RB set, and a set of multiple common locations of a control channel within the RB set. The communications manager 1420 may be configured as or otherwise support a means for transmitting a truncated DMRS sequence via at least a subset of the set of multiple common DMRS locations within the RB set. The communications manager 1420 may be configured as or otherwise support a means for transmitting SCI via at least a subset of the set of multiple common locations of the control channel corresponding to the subset of the set of multiple common DMRS locations.

Additionally, or alternatively, the communications manager 1420 may support wireless communication at a wireless device in accordance with examples as disclosed herein. For example, the communications manager 1420 may be configured as or otherwise support a means for identifying an RB set, a set of multiple common DMRS locations within the RB set, and a set of multiple common locations of a control channel within the RB set. The communications manager 1420 may be configured as or otherwise support a means for receiving a truncated DMRS sequence via at least a subset of the set of multiple common DMRS locations within the RB set. The communications manager 1420 may be configured as or otherwise support a means for receiving SCI via at least a subset of the set of multiple common locations of the control channel corresponding to the subset of the set of multiple common DMRS locations.

Additionally, or alternatively, the communications manager 1420 may support wireless communication at a wireless device in accordance with examples as disclosed herein. For example, the communications manager 1420 may be configured as or otherwise support a means for identifying an RB set and a set of multiple control RB grids within the RB set, where each control RB grid is offset in frequency relative a respective RB grid of the set of multiple control RB grids. The communications manager 1420 may be configured as or otherwise support a means for selecting a first control RB grid from the set of multiple control RB grids for transmitting SCI, the first control RB grid indicating a set of multiple locations for a control channel. The communications manager 1420 may be configured as or otherwise support a means for transmitting the SCI via at least a subset of the set of multiple locations for the control channel of the first control RB grid.

Additionally, or alternatively, the communications manager 1420 may support wireless communication at a wireless device in accordance with examples as disclosed herein. For example, the communications manager 1420 may be configured as or otherwise support a means for identifying an RB set and a set of multiple control RB grids within the RB set, where each control RB grid is offset in frequency relative a respective RB grid of the set of multiple control RB grids. The communications manager 1420 may be configured as or otherwise support a means for performing decoding of a set of multiple decoding hypotheses corresponding to the set of multiple control RB grids. The communications manager 1420 may be configured as or otherwise support a means for outputting SCI decoded via at least a subset of a set of multiple locations of a control channel corresponding to a first control RB grid of the set of multiple control RB grids based on performing the decoding of the set of multiple decoding hypotheses.

By including or configuring the communications manager 1420 in accordance with examples as described herein, the device 1405 may support techniques for RB grid alignment in sidelink nodes which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of RB grid alignment at sidelink nodes as described herein, or the processor 1440 and the memory 1430 may be otherwise configured to perform or support such operations.

Figure 15:
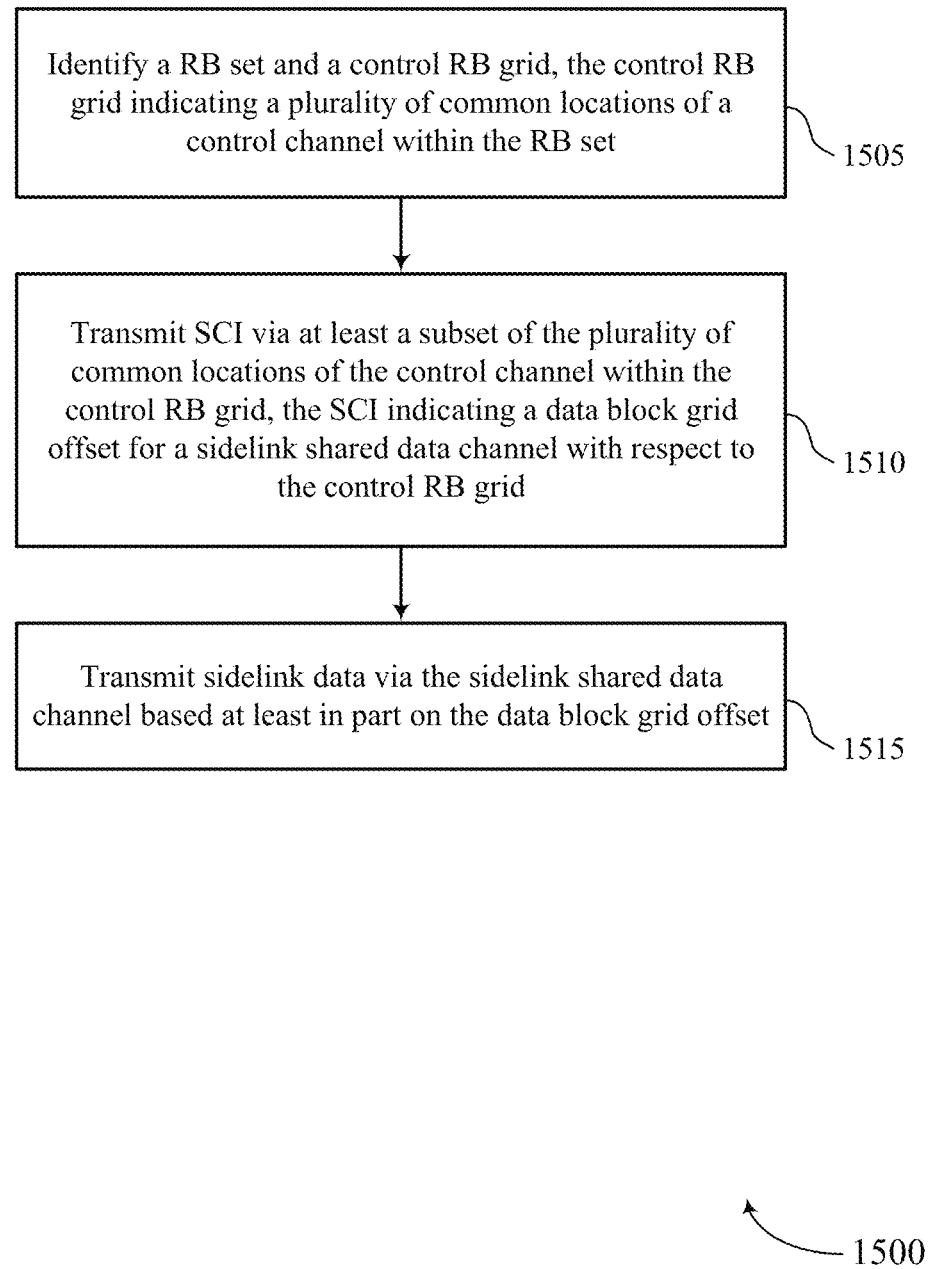
FIGS. 15 through 20 show flowcharts illustrating methods that support RB grid alignment at sidelink nodes in accordance with one or more aspects of the present disclosure.

FIG. 15 shows a flowchart illustrating a method 1500 that supports RB grid alignment at sidelink nodes in accordance with one or more aspects of the present disclosure. The operations of the method 1500 may be implemented by a UE or its components as described herein. For example, the operations of the method 1500 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1505, the method may include identifying an RB set and a control RB grid, the control RB grid indicating a set of multiple common locations of a control channel within the RB set. The operations of 1505 may be performed in accordance with examples as disclosed herein. In some examples, aspects of the operations of 1505 may be performed by a resource identification component 1325 as described with reference to FIG. 13.

At 1510, the method may include transmitting SCI via at least a subset of the set of multiple common locations of the control channel within the control RB grid, the SCI indicating a data block grid offset for a sidelink shared data channel with respect to the control RB grid. The operations of 1510 may be performed in accordance with examples as disclosed herein. In some examples, aspects of the operations of 1510 may be performed by a SCI component 1330 as described with reference to FIG. 13.

At 1515, the method may include transmitting sidelink data via the sidelink shared data channel based on the data block grid offset. The operations of 1515 may be performed in accordance with examples as disclosed herein. In some examples, aspects of the operations of 1515 may be performed by a sidelink data component 1335 as described with reference to FIG. 13.

Figure 16:
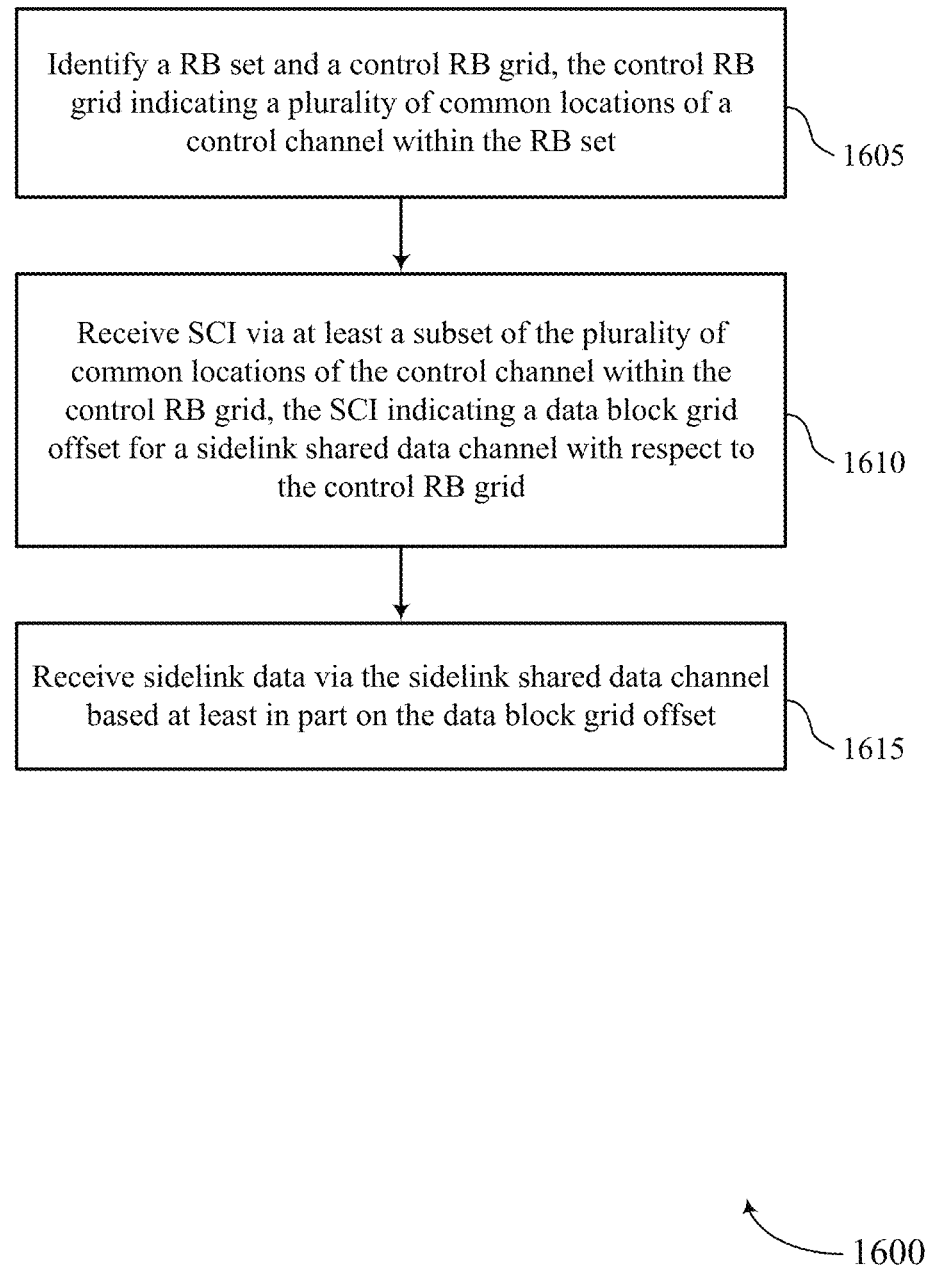

FIG. 16 shows a flowchart illustrating a method 1600 that supports RB grid alignment at sidelink nodes in accordance with one or more aspects of the present disclosure. The operations of the method 1600 may be implemented by a UE or its components as described herein. For example, the operations of the method 1600 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1605, the method may include identifying an RB set and a control RB grid, the control RB grid indicating a set of multiple common locations of a control channel within the RB set. The operations of 1605 may be performed in accordance with examples as disclosed herein. In some examples, aspects of the operations of 1605 may be performed by a resource identification component 1325 as described with reference to FIG. 13.

At 1610, the method may include receiving SCI via at least a subset of the set of multiple common locations of the control channel within the control RB grid, the SCI indicating a data block grid offset for a sidelink shared data channel with respect to the control RB grid. The operations of 1610 may be performed in accordance with examples as disclosed herein. In some examples, aspects of the operations of 1610 may be performed by a SCI component 1330 as described with reference to FIG. 13.

At 1615, the method may include receiving sidelink data via the sidelink shared data channel based on the data block grid offset. The operations of 1615 may be performed in accordance with examples as disclosed herein. In some examples, aspects of the operations of 1615 may be performed by a sidelink data component 1335 as described with reference to FIG. 13.

Figure 17:
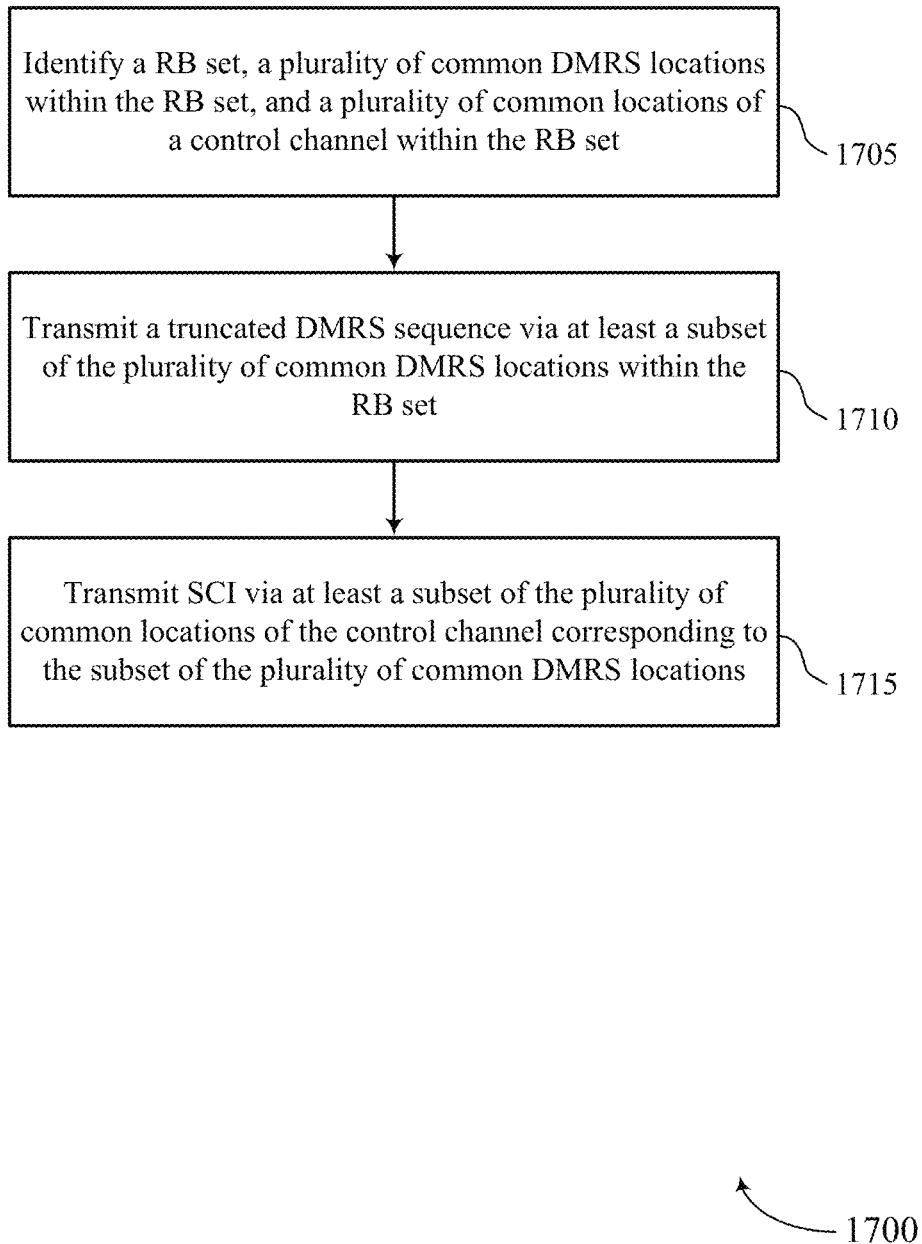

FIG. 17 shows a flowchart illustrating a method 1700 that supports RB grid alignment at sidelink nodes in accordance with one or more aspects of the present disclosure. The operations of the method 1700 may be implemented by a UE or its components as described herein. For example, the operations of the method 1700 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1705, the method may include identifying an RB set, a set of multiple common DMRS locations within the RB set, and a set of multiple common locations of a control channel within the RB set. The operations of 1705 may be performed in accordance with examples as disclosed herein. In some examples, aspects of the operations of 1705 may be performed by a resource identification component 1325 as described with reference to FIG. 13.

At 1710, the method may include transmitting a truncated DMRS sequence via at least a subset of the set of multiple common DMRS locations within the RB set. The operations of 1710 may be performed in accordance with examples as disclosed herein. In some examples, aspects of the operations of 1710 may be performed by a DMRS component 1340 as described with reference to FIG. 13.

At 1715, the method may include transmitting SCI via at least a subset of the set of multiple common locations of the control channel corresponding to the subset of the set of multiple common DMRS locations. The operations of 1715 may be performed in accordance with examples as disclosed herein. In some examples, aspects of the operations of 1715 may be performed by a SCI component 1330 as described with reference to FIG. 13.

Figure 18:
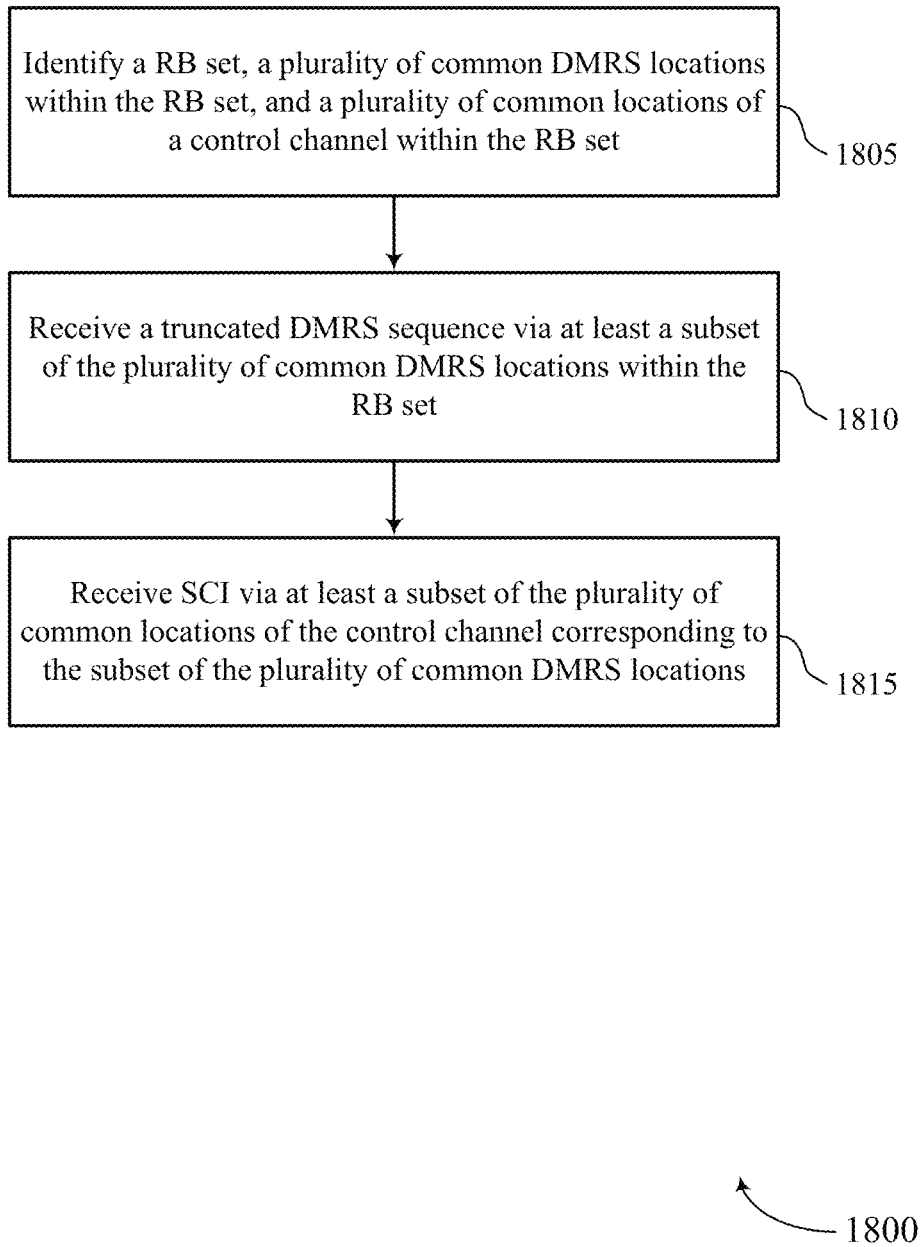

FIG. 18 shows a flowchart illustrating a method 1800 that supports RB grid alignment at sidelink nodes in accordance with one or more aspects of the present disclosure. The operations of the method 1800 may be implemented by a UE or its components as described herein. For example, the operations of the method 1800 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1805, the method may include identifying an RB set, a set of multiple common DMRS locations within the RB set, and a set of multiple common locations of a control channel within the RB set. The operations of 1805 may be performed in accordance with examples as disclosed herein. In some examples, aspects of the operations of 1805 may be performed by a resource identification component 1325 as described with reference to FIG. 13.

At 1810, the method may include receiving a truncated DMRS sequence via at least a subset of the set of multiple common DMRS locations within the RB set. The operations of 1810 may be performed in accordance with examples as disclosed herein. In some examples, aspects of the operations of 1810 may be performed by a DMRS component 1340 as described with reference to FIG. 13.

At 1815, the method may include receiving SCI via at least a subset of the set of multiple common locations of the control channel corresponding to the subset of the set of multiple common DMRS locations. The operations of 1815 may be performed in accordance with examples as disclosed herein. In some examples, aspects of the operations of 1815 may be performed by a SCI component 1330 as described with reference to FIG. 13.

Figure 19:
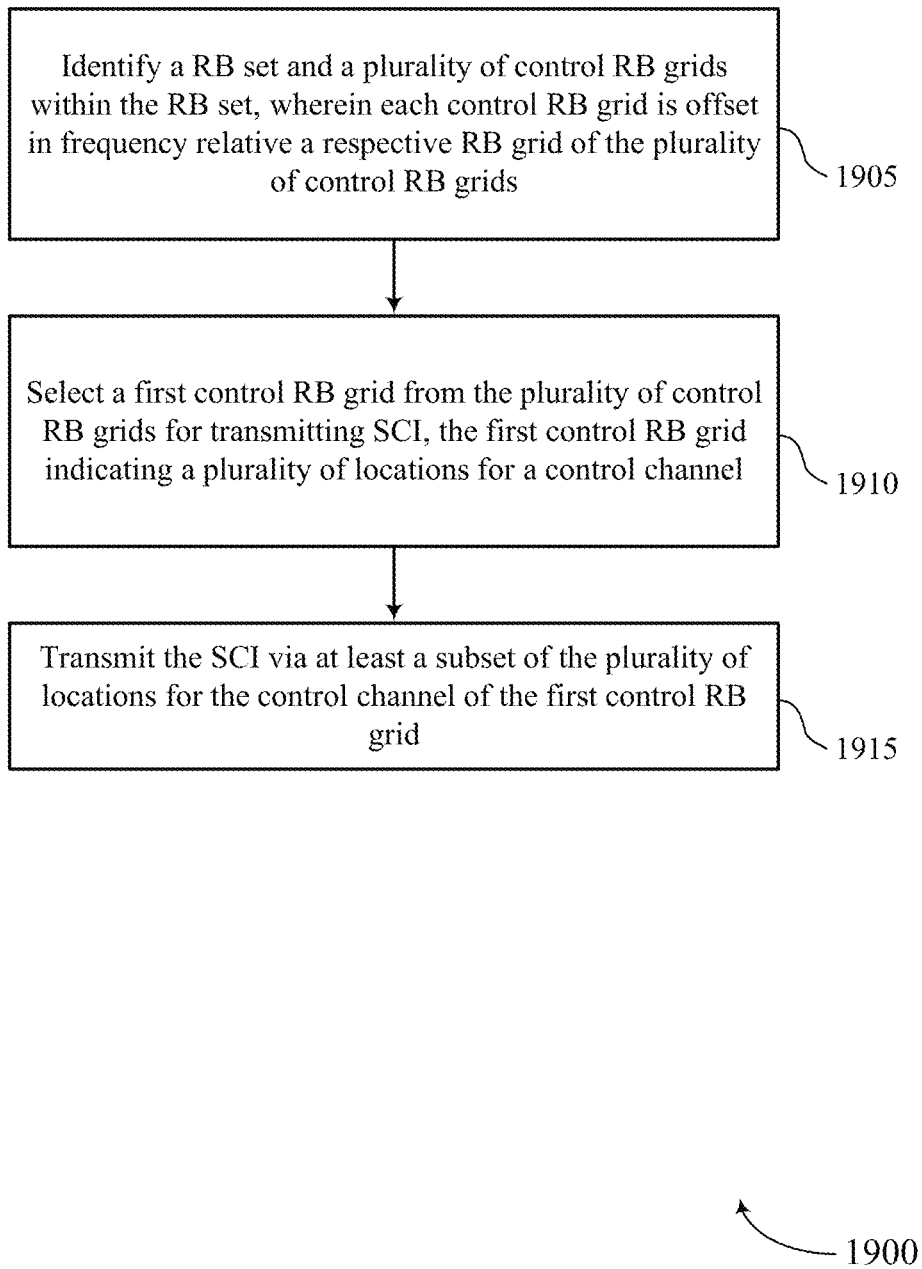

FIG. 19 shows a flowchart illustrating a method 1900 that supports RB grid alignment at sidelink nodes in accordance with one or more aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1905, the method may include identifying an RB set and a set of multiple control RB grids within the RB set, where each control RB grid is offset in frequency relative a respective RB grid of the set of multiple control RB grids. The operations of 1905 may be performed in accordance with examples as disclosed herein. In some examples, aspects of the operations of 1905 may be performed by a resource identification component 1325 as described with reference to FIG. 13.

At 1910, the method may include selecting a first control RB grid from the set of multiple control RB grids for transmitting SCI, the first control RB grid indicating a set of multiple locations for a control channel. The operations of 1910 may be performed in accordance with examples as disclosed herein. In some examples, aspects of the operations of 1910 may be performed by a resource identification component 1325 as described with reference to FIG. 13.

At 1915, the method may include transmitting the SCI via at least a subset of the set of multiple locations for the control channel of the first control RB grid. The operations of 1915 may be performed in accordance with examples as disclosed herein. In some examples, aspects of the operations of 1915 may be performed by a SCI component 1330 as described with reference to FIG. 13.

Figure 20:
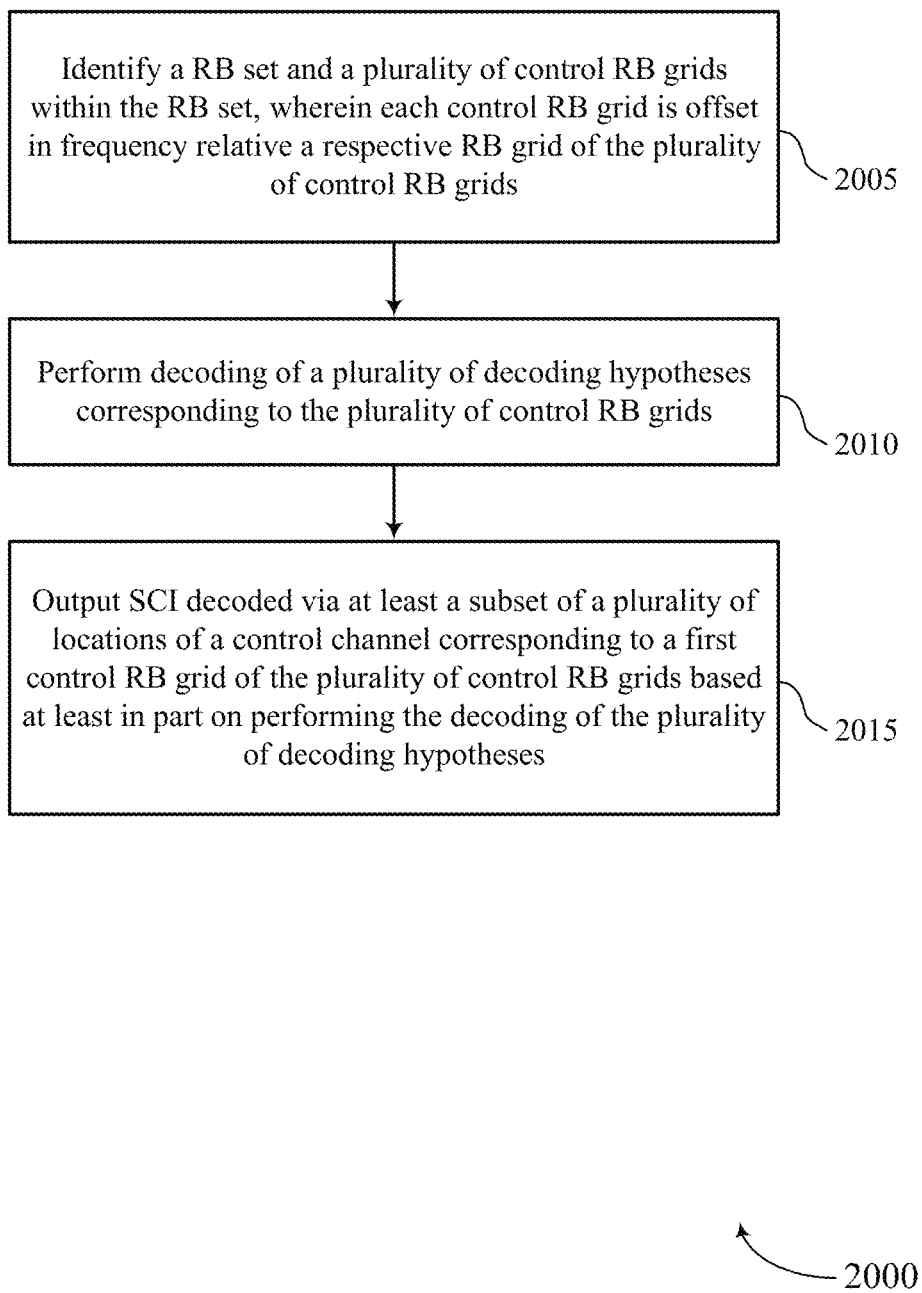

FIG. 20 shows a flowchart illustrating a method 2000 that supports RB grid alignment at sidelink nodes in accordance with one or more aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2005, the method may include identifying an RB set and a set of multiple control RB grids within the RB set, where each control RB grid is offset in frequency relative a respective RB grid of the set of multiple control RB grids. The operations of 2005 may be performed in accordance with examples as disclosed herein. In some examples, aspects of the operations of 2005 may be performed by a resource identification component 1325 as described with reference to FIG. 13.

At 2010, the method may include performing decoding of a set of multiple decoding hypotheses corresponding to the set of multiple control RB grids. The operations of 2010 may be performed in accordance with examples as disclosed herein. In some examples, aspects of the operations of 2010 may be performed by a decoding component 1345 as described with reference to FIG. 13.

At 2015, the method may include outputting SCI decoded via at least a subset of a set of multiple locations of a control channel corresponding to a first control RB grid of the set of multiple control RB grids based on performing the decoding of the set of multiple decoding hypotheses. The operations of 2015 may be performed in accordance with examples as disclosed herein. In some examples, aspects of the operations of 2015 may be performed by a SCI component 1330 as described with reference to FIG. 13.

The following provides an overview of aspects of the present disclosure:

Aspect 1: A method for wireless communication at a wireless device, comprising: identifying a RB set and a control RB grid, the control RB grid indicating a plurality of common locations of a control channel within the RB set; transmitting SCI via at least a subset of the plurality of common locations of the control channel within the control RB grid, the SCI indicating a data block grid offset for a sidelink shared data channel with respect to the control RB grid; and transmitting sidelink data via the sidelink shared data channel based at least in part on the data block grid offset.

Aspect 2: The method of aspect 1, wherein identifying the RB set and the control RB grid comprises: receiving control signaling indicating the RB set and the control RB grid, the control signaling indicating a configuration for the RB set.

Aspect 3: The method of any of aspects 1 through 2, wherein transmitting the sidelink data via the sidelink shared data channel comprises: TDMing the sidelink shared data channel with the control channel, wherein a symbol associated with the sidelink shared data channel follows one or more symbols associated with the control channel, and wherein the data block grid offset applies to the sidelink shared data channel based at least in part on the symbol following the one or more symbols associated with the control channel.

Aspect 4: The method of any of aspects 1 through 3, further comprising: selecting the data block grid offset for the sidelink shared data channel, wherein transmitting the sidelink data via the sidelink shared data channel is based at least in part on selecting the data block grid offset.

Aspect 5: The method of any of aspects 1 through 4, wherein transmitting the sidelink data via the sidelink shared data channel comprises: rate matching the sidelink shared data channel in one or more sidelink shared data channel symbols other than one or more RBs of a subchannel associated with the sidelink shared data channel.

Aspect 6: The method of any of aspects 1 through 4, wherein transmitting the sidelink data via the sidelink shared data channel comprises: rate matching the sidelink shared data channel in one or more sidelink shared data channel symbols other than one or more REs of a subchannel associated with the sidelink shared data channel, wherein the one or more REs correspond to the data block grid offset.

Aspect 7: The method of any of aspects 1 through 4, wherein transmitting the sidelink data via the sidelink shared data channel comprises: rate matching the sidelink shared data channel in one or more sidelink shared data channel symbols other than one or more frequency resources associated with the plurality of common locations of the control channel within the control RB grid.

Aspect 8: The method of any of aspects 1 through 7, wherein the data block grid offset indicates a data block grid within the RB set.

Aspect 9: A method for wireless communication at a wireless device, comprising: identifying a RB set and a control RB grid, the control RB grid indicating a plurality of common locations of a control channel within the RB set; receiving SCI via at least a subset of the plurality of common locations of the control channel within the control RB grid, the SCI indicating a data block grid offset for a sidelink shared data channel with respect to the control RB grid; and receiving sidelink data via the sidelink shared data channel based at least in part on the data block grid offset.

Aspect 10: The method of aspect 9, wherein identifying the RB set and the control RB grid comprises: receiving control signaling indicating the RB set and the control RB grid, the control signaling indicating a configuration for the RB set.

Aspect 11: The method of any of aspects 9 through 10, wherein receiving the sidelink data via the sidelink shared data channel comprises: TDMing the sidelink shared data channel with the control channel, wherein a symbol associated with the sidelink shared data channel follows one or more symbols associated with the control channel, and wherein the data block grid offset applies to the sidelink shared data channel based at least in part on the symbol following the one or more symbols associated with the control channel.

Aspect 12: The method of any of aspects 9 through 11, wherein receiving the sidelink data via the sidelink shared data channel comprises: rate matching the sidelink shared data channel in one or more sidelink shared data channel symbols other than one or more RBs of a subchannel associated with the sidelink shared data channel.

Aspect 13: The method of any of aspects 9 through 11, wherein receiving the sidelink data via the sidelink shared data channel comprises: rate matching the sidelink shared data channel in one or more sidelink shared data channel symbols other than one or more REs of a subchannel associated with the sidelink shared data channel, wherein the one or more REs correspond to the data block grid offset.

Aspect 14: The method of any of aspects 9 through 11, wherein receiving the sidelink data via the sidelink shared data channel comprises: rate matching the sidelink shared data channel in one or more sidelink shared data channel symbols other than one or more frequency resources associated with the plurality of common locations of the control channel within the control RB grid.

Aspect 15: The method of any of aspects 9 through 14, wherein the data block grid offset indicates a data block grid within the RB set.

Aspect 16: A method for wireless communication at a wireless device, comprising: identifying a RB set, a plurality of common DMRS locations within the RB set, and a plurality of common locations of a control channel within the RB set; transmitting a truncated DMRS sequence via at least a subset of the plurality of common DMRS locations within the RB set; and transmitting SCI via at least a subset of the plurality of common locations of the control channel corresponding to the subset of the plurality of common DMRS locations.

Aspect 17: The method of aspect 16, wherein identifying the RB set, the plurality of common DMRS locations, and the plurality of common locations of the control channel comprises: receiving control signaling indicating the RB set, the plurality of common DMRS locations, the plurality of common locations of the control channel, or any combination thereof, the control signaling indicating a configuration for the RB set.

Aspect 18: The method of any of aspects 16 through 17, further comprising: identifying a mapping of the truncated DMRS sequence that begins at a common frequency location of the RB set, wherein transmitting the truncated DMRS sequence is based at least in part on the mapping.

Aspect 19: The method of aspect 18, wherein transmitting the truncated DMRS sequence comprises: transmitting the truncated DMRS sequence in one or more allocated common RBs of the RB set based at least in part on a sidelink resource pool configuration, wherein the truncated DMRS sequence corresponds to the mapping.

Aspect 20: The method of any of aspects 16 through 17, further comprising: identifying a mapping of the truncated DMRS sequence that begins at a common frequency location of the RB set associated with a first RB offset, wherein transmitting the truncated DMRS sequence is based at least in part on the mapping.

Aspect 21: The method of aspect 20, wherein the mapping corresponds to a RE offset that is based at least in part on an RB grid associated with the control channel.

Aspect 22: The method of any of aspects 20 through 21, wherein a scrambling ID associated with the truncated DMRS sequence is independent of an RB grid associated with the control channel.

Aspect 23: The method of any of aspects 16 through 22, further comprising: identifying a mapping of the truncated DMRS sequence that begins at a frequency location of a common RB grid, wherein transmitting the truncated DMRS sequence is based at least in part on the mapping.

Aspect 24: The method of any of aspects 16 through 23, wherein transmitting the SCI comprises: transmitting the SCI indicating a data block grid offset for a sidelink shared data channel with respect to a common RB grid.

Aspect 25: The method of aspect 24, further comprising: transmitting sidelink data via the sidelink shared data channel based at least in part on the data block grid offset, wherein the data block grid offset indicates a data block grid within the RB set.

Aspect 26: The method of any of aspects 16 through 25, wherein the SCI is transmitted via a signal having a continuous waveform or an interlaced waveform.

Aspect 27: A method for wireless communication at a wireless device, comprising: identifying a RB set, a plurality of common DMRS locations within the RB set, and a plurality of common locations of a control channel within the RB set; receiving a truncated DMRS sequence via at least a subset of the plurality of common DMRS locations within the RB set; and receiving SCI via at least a subset of the plurality of common locations of the control channel corresponding to the subset of the plurality of common DMRS locations.

Aspect 28: The method of aspect 27, wherein identifying the RB set, the plurality of common DMRS locations, and the plurality of common locations of the control channel comprises: receiving control signaling indicating the RB set, the plurality of common DMRS locations, the plurality of common locations of the control channel, or any combination thereof, the control signaling indicating a configuration for the RB set.

Aspect 29: The method of any of aspects 27 through 28, further comprising: identifying a mapping of the truncated DMRS sequence that begins at a common frequency location of the RB set, wherein receiving the truncated DMRS sequence is based at least in part on the mapping.

Aspect 30: The method of aspect 29, wherein receiving the truncated DMRS sequence comprises: receiving the truncated DMRS sequence in one or more allocated common RBs of the RB set based at least in part on a sidelink resource pool configuration, wherein the truncated DMRS sequence corresponds to the mapping.

Aspect 31: The method of any of aspects 27 through 28, further comprising: identifying a mapping of the truncated DMRS sequence that begins at a common frequency location of the RB set associated with a first RB offset, wherein receiving the truncated DMRS sequence is based at least in part on the mapping.

Aspect 32: The method of aspect 31, wherein the mapping corresponds to a RE offset that is based at least in part on an RB grid associated with the control channel.

Aspect 33: The method of any of aspects 31 through 32, wherein a scrambling ID associated with the truncated DMRS sequence is independent of an RB grid associated with the control channel.

Aspect 34: The method of any of aspects 27 through 33, further comprising: identifying a mapping of the truncated DMRS sequence that begins at a frequency location of a common RB grid, wherein receiving the truncated DMRS sequence is based at least in part on the mapping.

Aspect 35: The method of any of aspects 27 through 34, wherein receiving the SCI comprises: receiving the SCI indicating a data block grid offset for a sidelink shared data channel with respect to a common RB grid.

Aspect 36: The method of aspect 35, further comprising: receiving sidelink data via the sidelink shared data channel based at least in part on the data block grid offset, wherein the data block grid offset indicates a data block grid within the RB set.

Aspect 37: The method of any of aspects 27 through 36, wherein receiving the SCI comprises: performing decoding of a plurality of decoding hypotheses corresponding to a plurality of control RB grids within the RB set.

Aspect 38: The method of any of aspects 27 through 37, further comprising: performing a channel estimation of the control channel using one or more first DMRS tones other than one or more second DMRS tones at an edge of the control channel.

Aspect 39: The method of any of aspects 27 through 38, wherein the SCI is received via a signal having a continuous waveform or an interlaced waveform.

Aspect 40: A method for wireless communication at a wireless device, comprising: identifying a RB set and a plurality of control RB grids within the RB set, wherein each control RB grid is offset in frequency relative a respective RB grid of the plurality of control RB grids; selecting a first control RB grid from the plurality of control RB grids for transmitting SCI, the first control RB grid indicating a plurality of locations for a control channel; and transmitting the SCI via at least a subset of the plurality of locations for the control channel of the first control RB grid.

Aspect 41: The method of aspect 40, wherein identifying the RB set and the plurality of control RB grids comprises: receiving control signaling indicating the RB set and the plurality of control RB grids, the control signaling indicating a configuration for the RB set.

Aspect 42: The method of any of aspects 40 through 41, further comprising: selecting the first control RB grid for transmitting sidelink data via a sidelink shared data channel, the first control RB grid indicating a plurality of locations for the sidelink shared data channel; and transmitting the sidelink data via at least a subset of the plurality of locations for the sidelink shared data channel of the first control RB grid.

Aspect 43: The method of any of aspects 40 through 42, further comprising: identifying a quantity of offset values associated with the plurality of control RB grids, wherein identifying the plurality of control RB grids is based at least in part on identifying the quantity of offset values.

Aspect 44: The method of aspect 43, wherein identifying the quantity of offset values comprises: receiving control signaling indicating the quantity of offset values.

Aspect 45: A method for wireless communication at a wireless device, comprising: identifying a RB set and a plurality of control RB grids within the RB set, wherein each control RB grid is offset in frequency relative a respective RB grid of the plurality of control RB grids; performing decoding of a plurality of decoding hypotheses corresponding to the plurality of control RB grids; and outputting SCI decoded via at least a subset of a plurality of locations of a control channel corresponding to a first control RB grid of the plurality of control RB grids based at least in part on performing the decoding of the plurality of decoding hypotheses.

Aspect 46: The method of aspect 45, wherein identifying the RB set and the plurality of control RB grids comprises: receiving control signaling indicating the RB set and the plurality of control RB grids, the control signaling indicating a configuration for the RB set.

Aspect 47: The method of any of aspects 45 through 46, further comprising: selecting the first control RB grid for decoding sidelink data via a sidelink shared data channel, the first control RB grid indicating a plurality of locations for the sidelink shared data channel; and outputting the sidelink data based at least in part on performing decoding on at least a subset of the plurality of locations for the sidelink shared data channel.

Aspect 48: The method of any of aspects 45 through 47, further comprising: identifying a quantity of offset values associated with the plurality of control RB grids, wherein identifying the plurality of control RB grids is based at least in part on identifying the quantity of offset values.

Aspect 49: The method of aspect 48, wherein identifying the quantity of offset values comprises: receiving control signaling indicating the quantity of offset values.

Aspect 50: An apparatus for wireless communication at a wireless device, comprising a processor; memory coupled with the processor; and instructions stored in the memory and executable by the processor to cause the apparatus to perform a method of any of aspects 1 through 8.

Aspect 51: An apparatus for wireless communication at a wireless device, comprising at least one means for performing a method of any of aspects 1 through 8.

Aspect 52: A non-transitory computer-readable medium storing code for wireless communication at a wireless device, the code comprising instructions executable by a processor to perform a method of any of aspects 1 through 8.

Aspect 53: An apparatus for wireless communication at a wireless device, comprising a processor; memory coupled with the processor; and instructions stored in the memory and executable by the processor to cause the apparatus to perform a method of any of aspects 9 through 15.

Aspect 54: An apparatus for wireless communication at a wireless device, comprising at least one means for performing a method of any of aspects 9 through 15.

Aspect 55: A non-transitory computer-readable medium storing code for wireless communication at a wireless device, the code comprising instructions executable by a processor to perform a method of any of aspects 9 through 15.

Aspect 56: An apparatus for wireless communication at a wireless device, comprising a processor; memory coupled with the processor; and instructions stored in the memory and executable by the processor to cause the apparatus to perform a method of any of aspects 16 through 26.

Aspect 57: An apparatus for wireless communication at a wireless device, comprising at least one means for performing a method of any of aspects 16 through 26.

Aspect 58: A non-transitory computer-readable medium storing code for wireless communication at a wireless device, the code comprising instructions executable by a processor to perform a method of any of aspects 16 through 26.

Aspect 59: An apparatus for wireless communication at a wireless device, comprising a processor; memory coupled with the processor; and instructions stored in the memory and executable by the processor to cause the apparatus to perform a method of any of aspects 27 through 39.

Aspect 60: An apparatus for wireless communication at a wireless device, comprising at least one means for performing a method of any of aspects 27 through 39.

Aspect 61: A non-transitory computer-readable medium storing code for wireless communication at a wireless device, the code comprising instructions executable by a processor to perform a method of any of aspects 27 through 39.

Aspect 62: An apparatus for wireless communication at a wireless device, comprising a processor; memory coupled with the processor; and instructions stored in the memory and executable by the processor to cause the apparatus to perform a method of any of aspects 40 through 44.

Aspect 63: An apparatus for wireless communication at a wireless device, comprising at least one means for performing a method of any of aspects 40 through 44.

Aspect 64: A non-transitory computer-readable medium storing code for wireless communication at a wireless device, the code comprising instructions executable by a processor to perform a method of any of aspects 40 through 44.

Aspect 65: An apparatus for wireless communication at a wireless device, comprising a processor; memory coupled with the processor; and instructions stored in the memory and executable by the processor to cause the apparatus to perform a method of any of aspects 45 through 49.

Aspect 66: An apparatus for wireless communication at a wireless device, comprising at least one means for performing a method of any of aspects 45 through 49.

Aspect 67: A non-transitory computer-readable medium storing code for wireless communication at a wireless device, the code comprising instructions executable by a processor to perform a method of any of aspects 45 through 49.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a wireless device, comprising:
    one or more processors;
    memory coupled with the one or more processors; and
    instructions stored in the memory and executable by the one or more processors to cause the apparatus to:
        identify a resource block set and a control resource block grid, the control resource block grid indicating a plurality of common locations of a control channel within the resource block set;
        transmit sidelink control information via at least a subset of the plurality of common locations of the control channel within the control resource block grid, the sidelink control information indicating a data block grid offset for a sidelink shared data channel with respect to the control resource block grid; and
        transmit sidelink data via the sidelink shared data channel based at least in part on the data block grid offset.

2. The apparatus of claim 1, wherein, to identify the resource block set and the control resource block grid, the instructions are further executable by the one or more processors to cause the apparatus to:
    receive control signaling indicating the resource block set and the control resource block grid, the control signaling indicating a configuration for the resource block set.

3. The apparatus of claim 1, wherein, to transmit the sidelink data via the sidelink shared data channel, the instructions are further executable by the one or more processors to cause the apparatus to:
    time division multiplex the sidelink shared data channel with the control channel, wherein a symbol associated with the sidelink shared data channel follows one or more symbols associated with the control channel, and wherein the data block grid offset applies to the sidelink shared data channel based at least in part on the symbol following the one or more symbols associated with the control channel.

4. The apparatus of claim 1, wherein the instructions are further executable by the one or more processors to cause the apparatus to:
    select the data block grid offset for the sidelink shared data channel, wherein transmitting the sidelink data via the sidelink shared data channel is based at least in part on selecting the data block grid offset.

5. The apparatus of claim 1, wherein, to transmit the sidelink data via the sidelink shared data channel, the instructions are further executable by the one or more processors to cause the apparatus to:
rate match the sidelink shared data channel in one or more sidelink shared data channel symbols other than one or more resource blocks of a subchannel associated with the sidelink shared data channel.

6. The apparatus of claim 1, wherein, to transmit the sidelink data via the sidelink shared data channel, the instructions are further executable by the one or more processors to cause the apparatus to:
rate match the sidelink shared data channel in one or more sidelink shared data channel symbols other than one or more resource elements of a subchannel associated with the sidelink shared data channel, wherein the one or more resource elements correspond to the data block grid offset.

7. The apparatus of claim 1, wherein, to transmit the sidelink data via the sidelink shared data channel, the instructions are further executable by the one or more processors to cause the apparatus to:
rate match the sidelink shared data channel in one or more sidelink shared data channel symbols other than one or more frequency resources associated with the plurality of common locations of the control channel within the control resource block grid.

8. The apparatus of claim 1, wherein the data block grid offset indicates a data block grid within the resource block set.

9. An apparatus for wireless communication at a wireless device, comprising:
one or more processors;
memory coupled with the one or more processors; and
instructions stored in the memory and executable by the one or more processors to cause the apparatus to:
identify a resource block set and a control resource block grid, the control resource block grid indicating a plurality of common locations of a control channel within the resource block set;
receive sidelink control information via at least a subset of the plurality of common locations of the control channel within the control resource block grid, the sidelink control information indicating a data block grid offset for a sidelink shared data channel with respect to the control resource block grid; and
receive sidelink data via the sidelink shared data channel based at least in part on the data block grid offset.

10. The apparatus of claim 9, wherein, to identify the resource block set and the control resource block grid, the instructions are further executable by the one or more processors to cause the apparatus to:
receive control signaling indicating the resource block set and the control resource block grid, the control signaling indicating a configuration for the resource block set.

11. The apparatus of claim 9, wherein, to receive the sidelink data via the sidelink shared data channel, the instructions are further executable by the one or more processors to cause the apparatus to:
time division multiplex the sidelink shared data channel with the control channel, wherein a symbol associated with the sidelink shared data channel follows one or more symbols associated with the control channel, and wherein the data block grid offset applies to the sidelink shared data channel based at least in part on the symbol following the one or more symbols associated with the control channel.

12. The apparatus of claim 9, wherein, to receive the sidelink data via the sidelink shared data channel, the instructions are further executable by the one or more processors to cause the apparatus to:
rate match the sidelink shared data channel in one or more sidelink shared data channel symbols other than one or more resource blocks of a subchannel associated with the sidelink shared data channel.

13. The apparatus of claim 9, wherein, to receive the sidelink data via the sidelink shared data channel, the instructions are further executable by the one or more processors to cause the apparatus to:
rate match the sidelink shared data channel in one or more sidelink shared data channel symbols other than one or more resource elements of a subchannel associated with the sidelink shared data channel, wherein the one or more resource elements correspond to the data block grid offset.

14. The apparatus of claim 9, wherein, to receive the sidelink data via the sidelink shared data channel, the instructions are further executable by the one or more processors to cause the apparatus to:
rate match the sidelink shared data channel in one or more sidelink shared data channel symbols other than one or more frequency resources associated with the plurality of common locations of the control channel within the control resource block grid.

15. An apparatus for wireless communication at a wireless device, comprising:
one or more processors;
memory coupled with the one or more processors; and
instructions stored in the memory and executable by the one or more processors to cause the apparatus to:
identify a resource block set, a plurality of common demodulation reference signal locations within the resource block set, and a plurality of common locations of a control channel within the resource block set;
transmit a truncated demodulation reference signal sequence via at least a subset of the plurality of common demodulation reference signal locations within the resource block set based at least in part on a mapping of the truncated demodulation reference signal sequence that begins at a common frequency location of the resource block set associated with a first resource block offset; and
transmit sidelink control information via at least a subset of the plurality of common locations of the control channel corresponding to the subset of the plurality of common demodulation reference signal locations.

16. The apparatus of claim 15, wherein, to identify the resource block set, the plurality of common demodulation reference signal locations, and the plurality of common locations of the control channel, the instructions are further executable by the one or more processors to cause the apparatus to:
receive control signaling indicating the resource block set, the plurality of common demodulation reference signal locations, the plurality of common locations of the control channel, or any combination thereof, the control signaling indicating a configuration for the resource block set.

17. The apparatus of claim 15, wherein the instructions are further executable by the one or more processors to cause the apparatus to:

identify a mapping of the truncated demodulation reference signal sequence that begins at a common frequency location of the resource block set, wherein transmitting the truncated demodulation reference signal sequence is based at least in part on the mapping.

18. The apparatus of claim 17, wherein, to transmit the truncated demodulation reference signal sequence, the instructions are further executable by the one or more processors to cause the apparatus to:
transmit the truncated demodulation reference signal sequence in one or more allocated common resource blocks of the resource block set based at least in part on a sidelink resource pool configuration, wherein the truncated demodulation reference signal sequence corresponds to the mapping.

19. The apparatus of claim 15, wherein the mapping corresponds to a resource element offset that is based at least in part on a resource block grid associated with the control channel.

20. The apparatus of claim 15, wherein a scrambling identifier associated with the truncated demodulation reference signal sequence is independent of a resource block grid associated with the control channel.

21. The apparatus of claim 15, wherein the instructions are further executable by the one or more processors to cause the apparatus to:
identify a mapping of the truncated demodulation reference signal sequence that begins at a frequency location of a common resource block grid, wherein transmitting the truncated demodulation reference signal sequence is based at least in part on the mapping.

22. The apparatus of claim 15, wherein, to transmit the sidelink control information, the instructions are further executable by the one or more processors to cause the apparatus to:
transmit the sidelink control information indicating a data block grid offset for a sidelink shared data channel with respect to a common resource block grid.

23. The apparatus of claim 22, wherein the instructions are further executable by the one or more processors to cause the apparatus to:
transmit sidelink data via the sidelink shared data channel based at least in part on the data block grid offset, wherein the data block grid offset indicates a data block grid within the resource block set.

24. The apparatus of claim 15, wherein the sidelink control information is transmitted via a signal having a continuous waveform or an interlaced waveform.

25. An apparatus for wireless communication at a wireless device, comprising:
one or more processors;
memory coupled with the one or more processors; and
instructions stored in the memory and executable by the one or more processors to cause the apparatus to:
identify a resource block set and a plurality of control resource block grids within the resource block set, wherein each control resource block grid is offset in frequency relative to a respective control resource block grid of the plurality of control resource block grids;
select a first control resource block grid from the plurality of control resource block grids for transmitting sidelink control information, the first control resource block grid indicating a plurality of locations for a control channel; and
transmit the sidelink control information via at least a subset of the plurality of locations for the control channel of the first control resource block grid.

26. The apparatus of claim 25, wherein, to identify the resource block set and the plurality of control resource block grids, the instructions are further executable by the one or more processors to cause the apparatus to:
receive control signaling indicating the resource block set and the plurality of control resource block grids, the control signaling indicating a configuration for the resource block set.

27. The apparatus of claim 25, wherein the instructions are further executable by the one or more processors to cause the apparatus to:
select the first control resource block grid for transmitting sidelink data via a sidelink shared data channel, the first control resource block grid indicating a plurality of locations for the sidelink shared data channel; and
transmit the sidelink data via at least a subset of the plurality of locations for the sidelink shared data channel of the first control resource block grid.

28. The apparatus of claim 25, wherein the instructions are further executable by the one or more processors to cause the apparatus to:
identify a quantity of offset values associated with the plurality of control resource block grids, wherein identifying the plurality of control resource block grids is based at least in part on identifying the quantity of offset values.

29. The apparatus of claim 28, wherein, to identify the quantity of offset values, the instructions are further executable by the one or more processors to cause the apparatus to:
receive control signaling indicating the quantity of offset values.

* * * * *